United States Patent
Morozov et al.

(10) Patent No.: US 12,009,692 B2
(45) Date of Patent: Jun. 11, 2024

(54) BACKUP SYSTEM, BACKUP INTERFACE MODULE, AND BASE PLATE

(71) Applicant: Solaredge Technologies Ltd., Herzeliya (IL)

(72) Inventors: Igor Morozov, Kfar-Yona (IL); Frank Bakker, Tel Aviv (IL); Bryon Gomberg, Kfar Sava (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/534,561

(22) Filed: Nov. 24, 2021

(65) Prior Publication Data
US 2022/0166250 A1 May 26, 2022

Related U.S. Application Data

(60) Provisional application No. 63/117,804, filed on Nov. 24, 2020, provisional application No. 63/117,969, filed on Nov. 24, 2020.

(51) Int. Cl.
*H02J 9/06* (2006.01)
*G06F 1/30* (2006.01)

(52) U.S. Cl.
CPC .............. *H02J 9/061* (2013.01); *H02J 9/068* (2020.01); *G06F 1/30* (2013.01)

(58) Field of Classification Search
CPC .... H02J 9/061; H02J 9/068; H02J 3/14; H02J 7/0042; H02J 9/062; H02J 9/06; G06F 1/30; Y04S 20/248; H05K 5/0247
USPC .......................................................... 307/64
See application file for complete search history.

(56) References Cited

U.S. PATENT DOCUMENTS

| | | | |
|---|---|---|---|
| 5,478,259 A | 12/1995 | Noschese | |
| 7,035,115 B2 | 4/2006 | Walesa | |
| 9,137,919 B2 | 9/2015 | Dorfer et al. | |
| 2019/0081458 A1* | 3/2019 | Lapushner | ............... H02B 1/03 |
| 2020/0336003 A1 | 10/2020 | Narla et al. | |

FOREIGN PATENT DOCUMENTS

DE 9105122 U1 8/1991

OTHER PUBLICATIONS

Mar. 25, 2022—EP Search Report—EP App. No. 21210276.8.

* cited by examiner

*Primary Examiner* — Richard Tan
(74) *Attorney, Agent, or Firm* — Banner & Witcoff, Ltd.

(57) ABSTRACT

Systems, apparatuses, and methods are described for a backup system. The configuration of the backup system in terms of number of load groups, power sources, and/or total power limit may be altered. An interface enclosure of the backup system may include a housing for electric circuitry, where the housing may be a clam-shell design including a base plate and a backup interface module. The base plate may comprise a frame, one or more detachable hinges, and/or two or more multi-terminals. The base plate may include a plurality of multi-terminals. The multi-terminals may be arranged to connect to one or more load groups, power sources, power devices, other multi-terminals, etc. Each load group that is connected to the multi-terminals may be disconnected from the utility grid and connected to the one or more sources of backup power in the case of a utility grid shutdown.

20 Claims, 33 Drawing Sheets

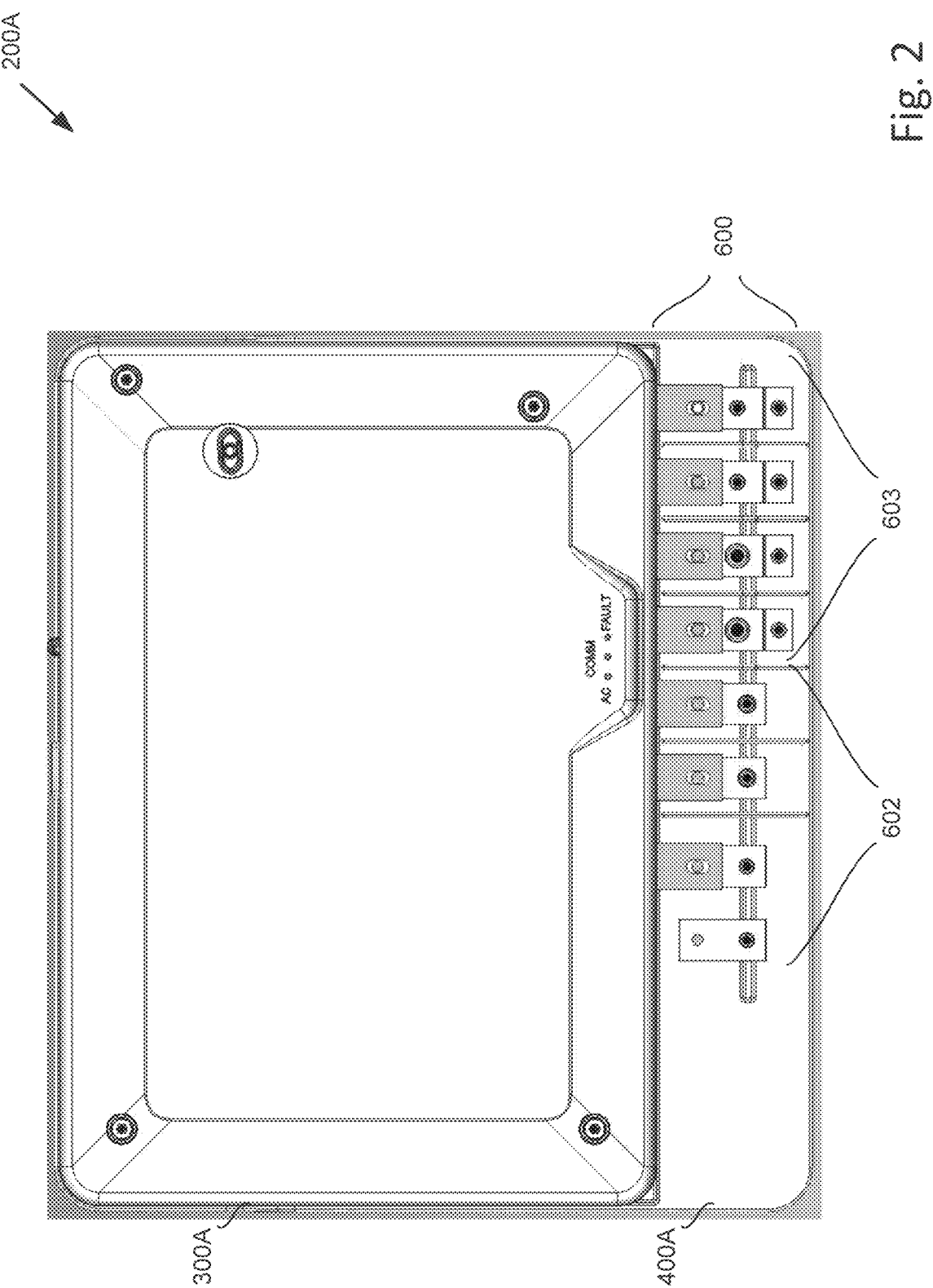

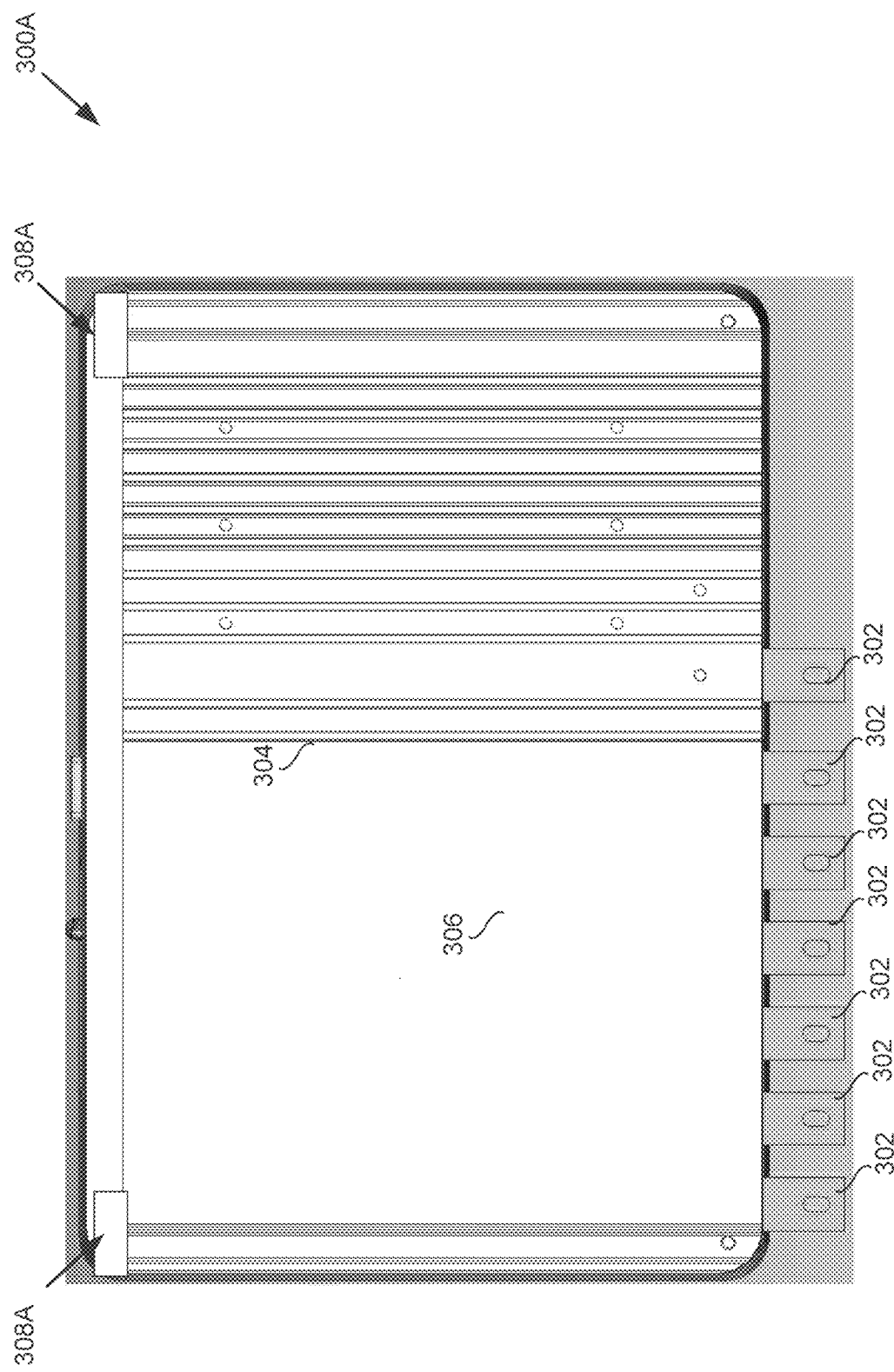

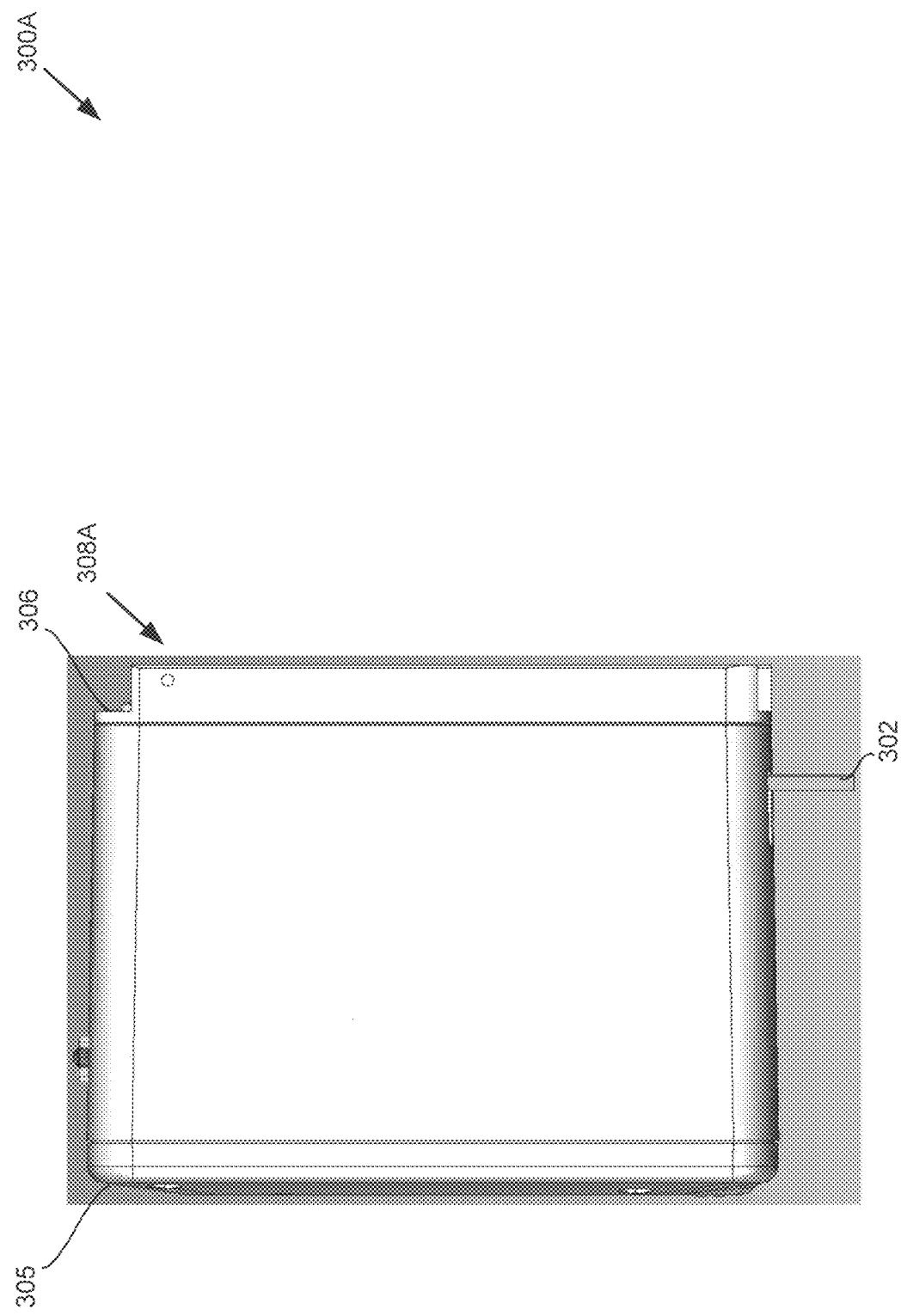

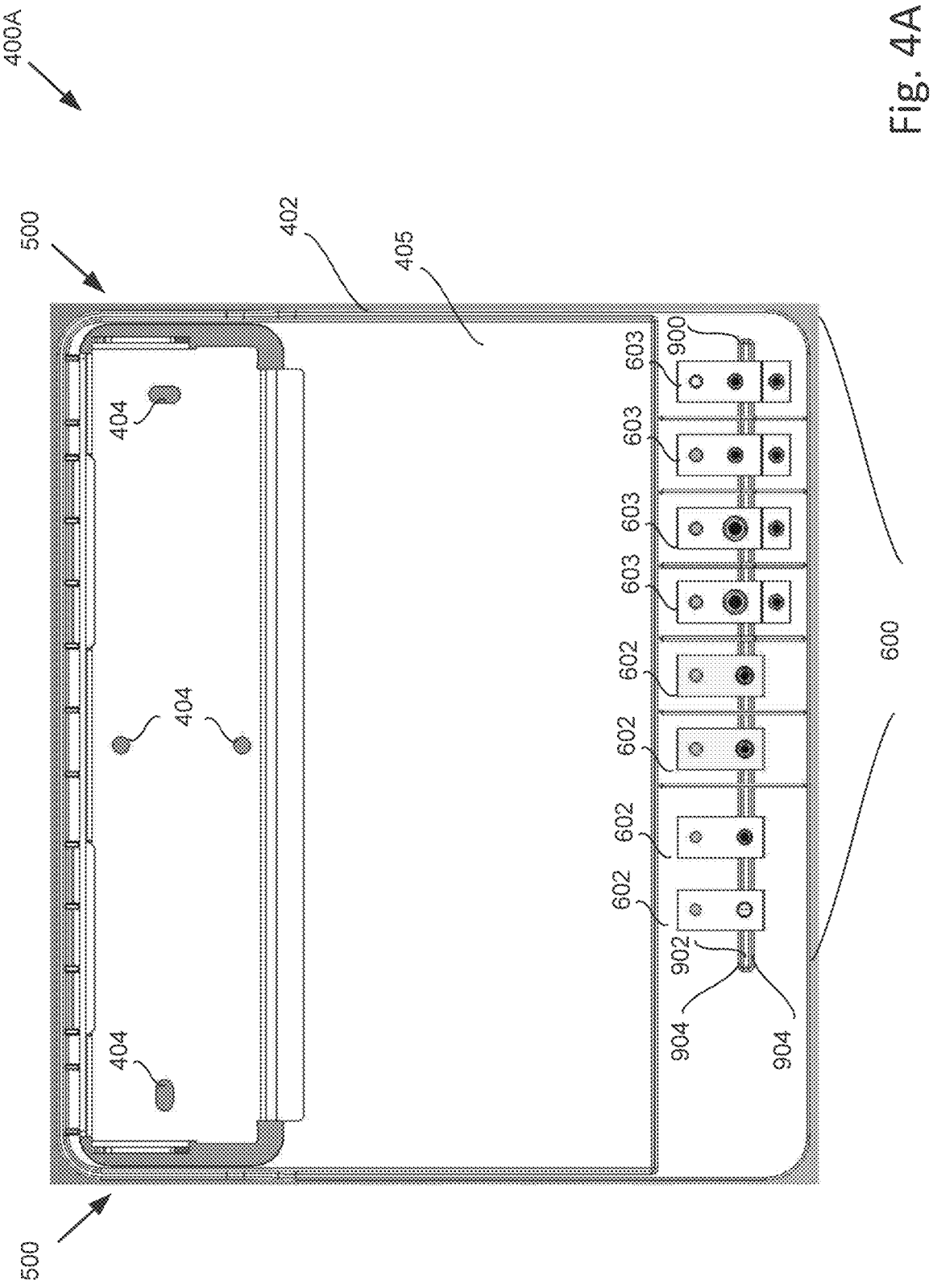

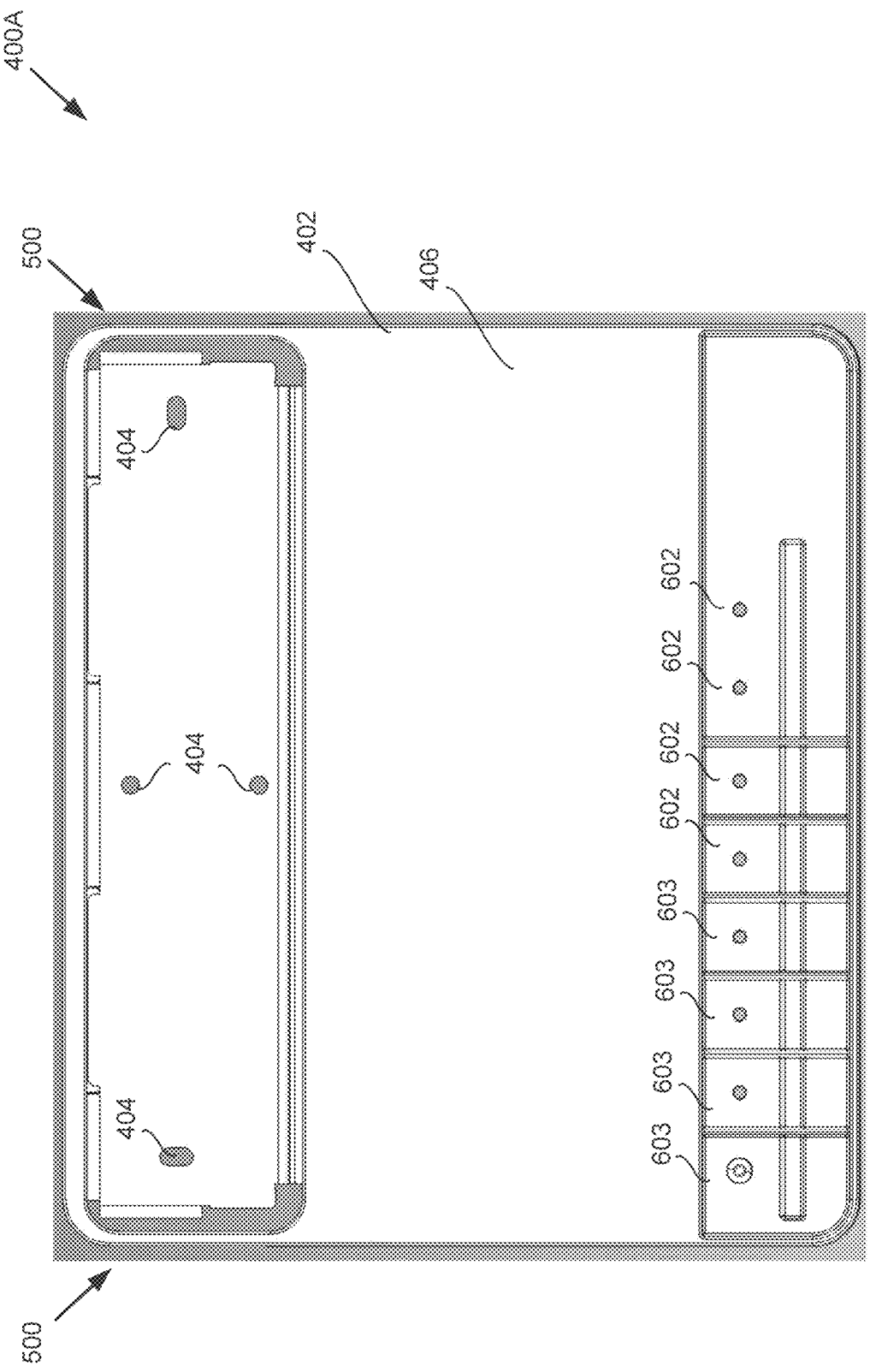

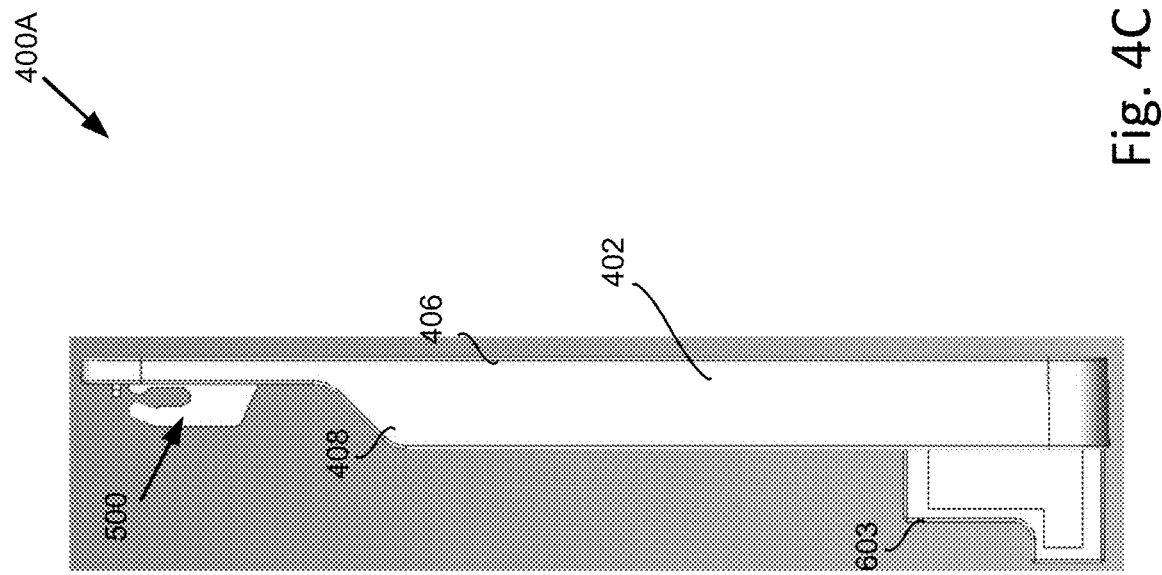

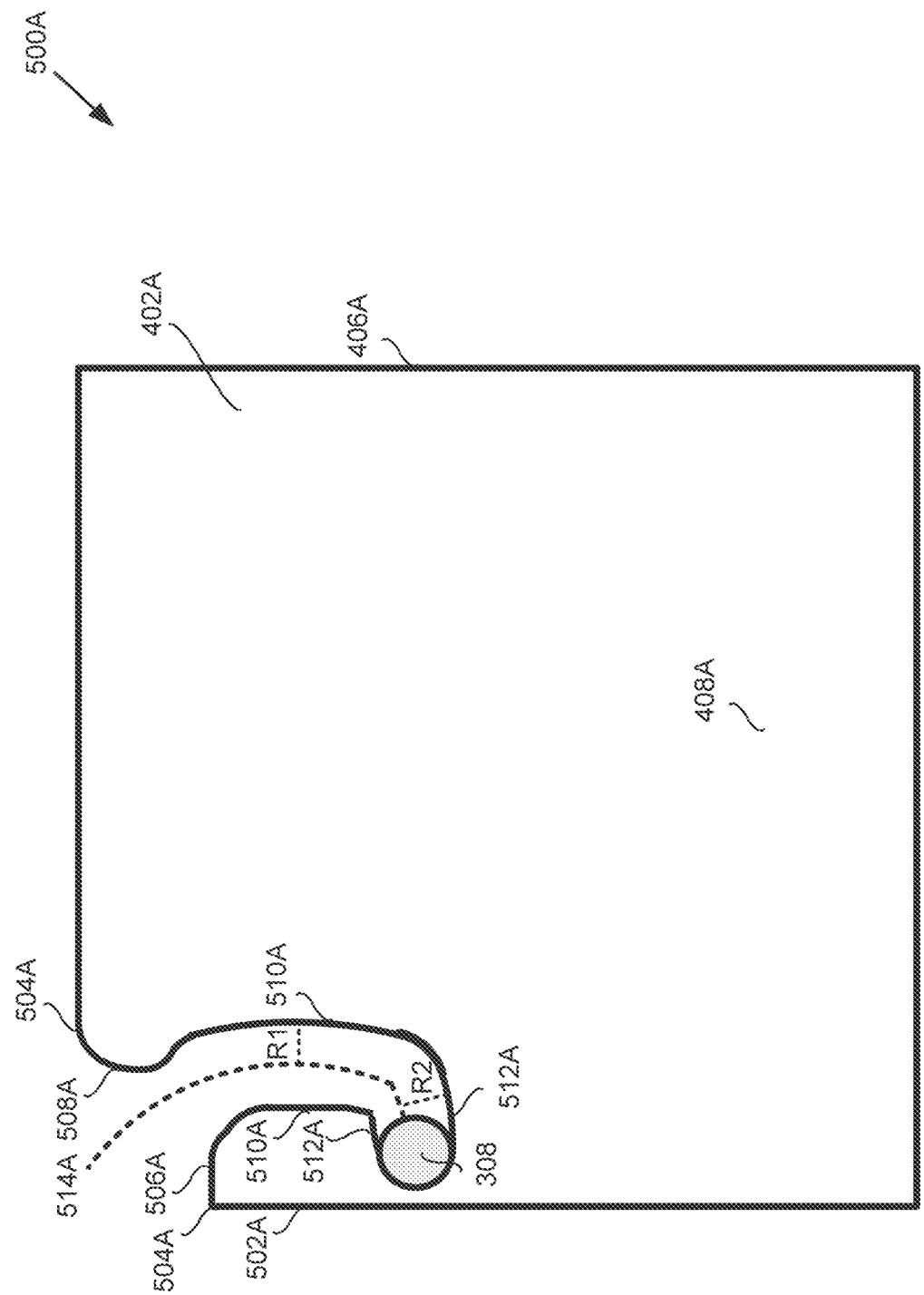

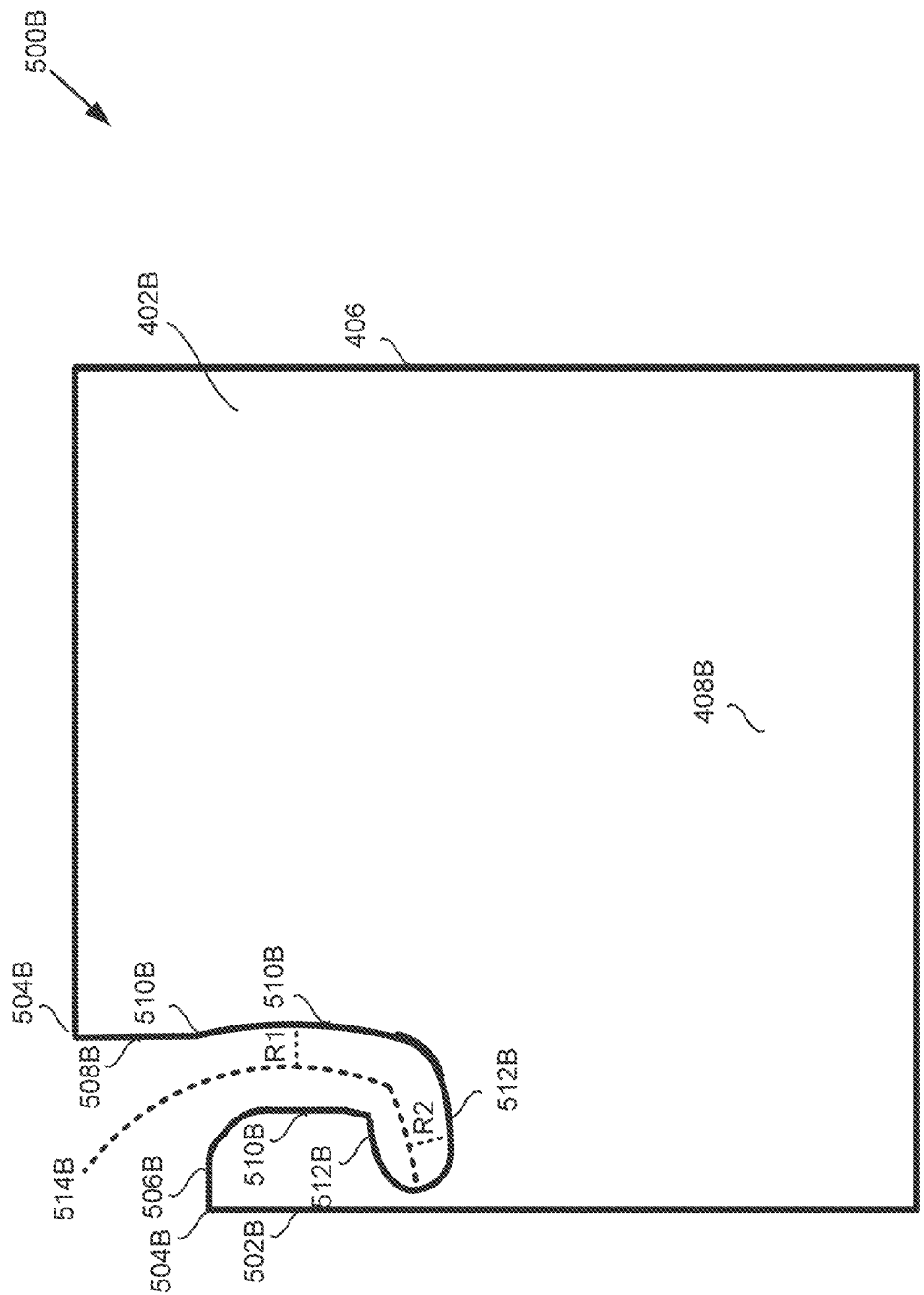

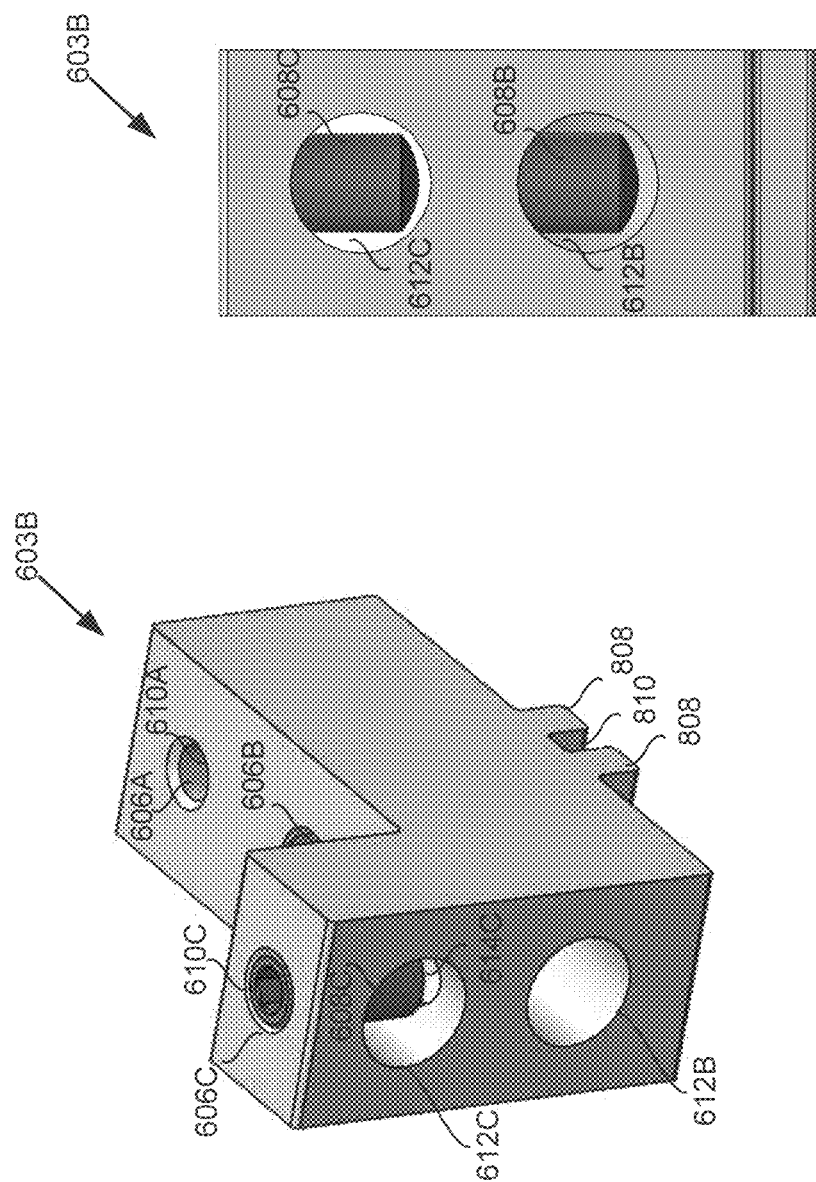

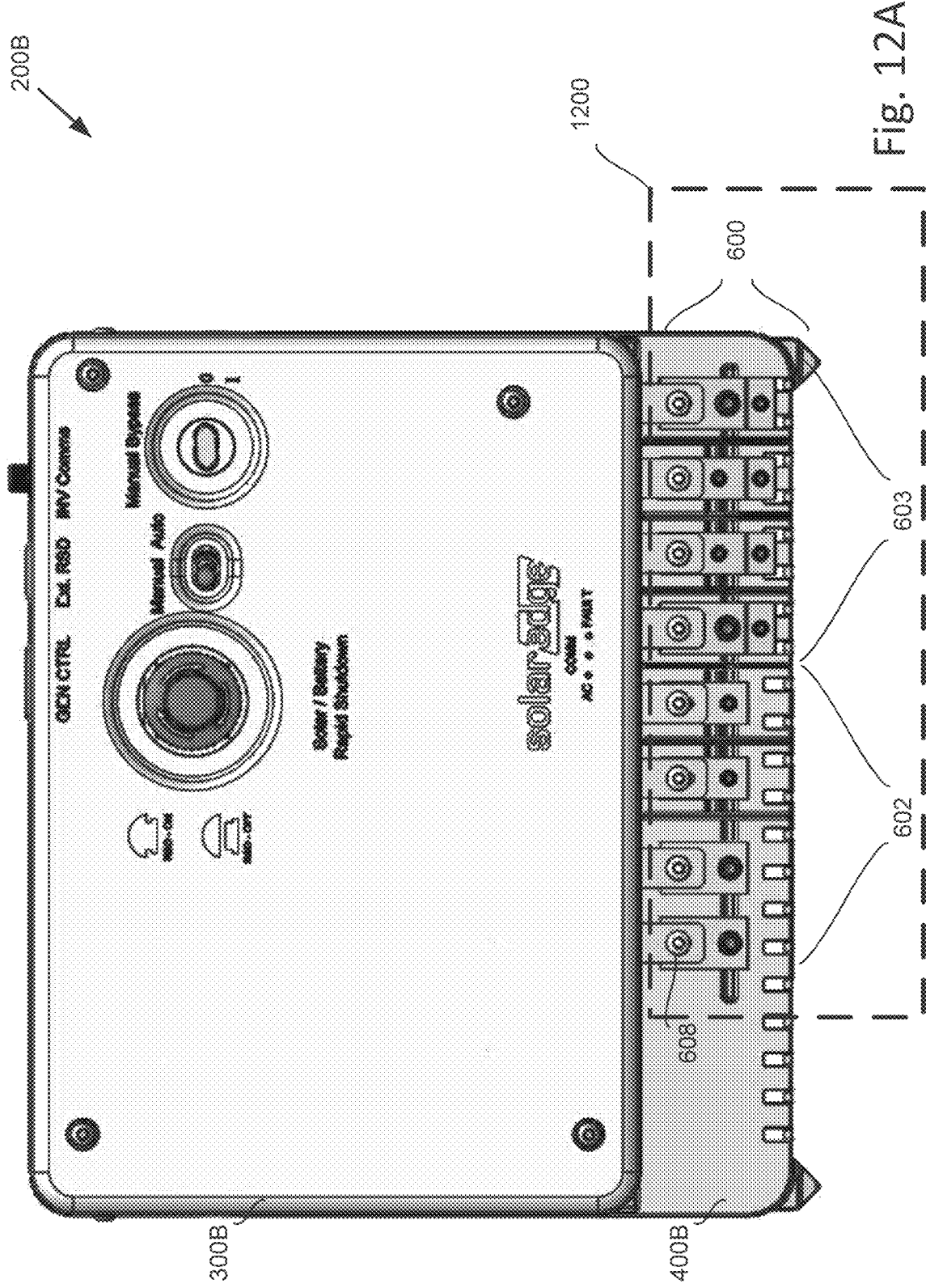

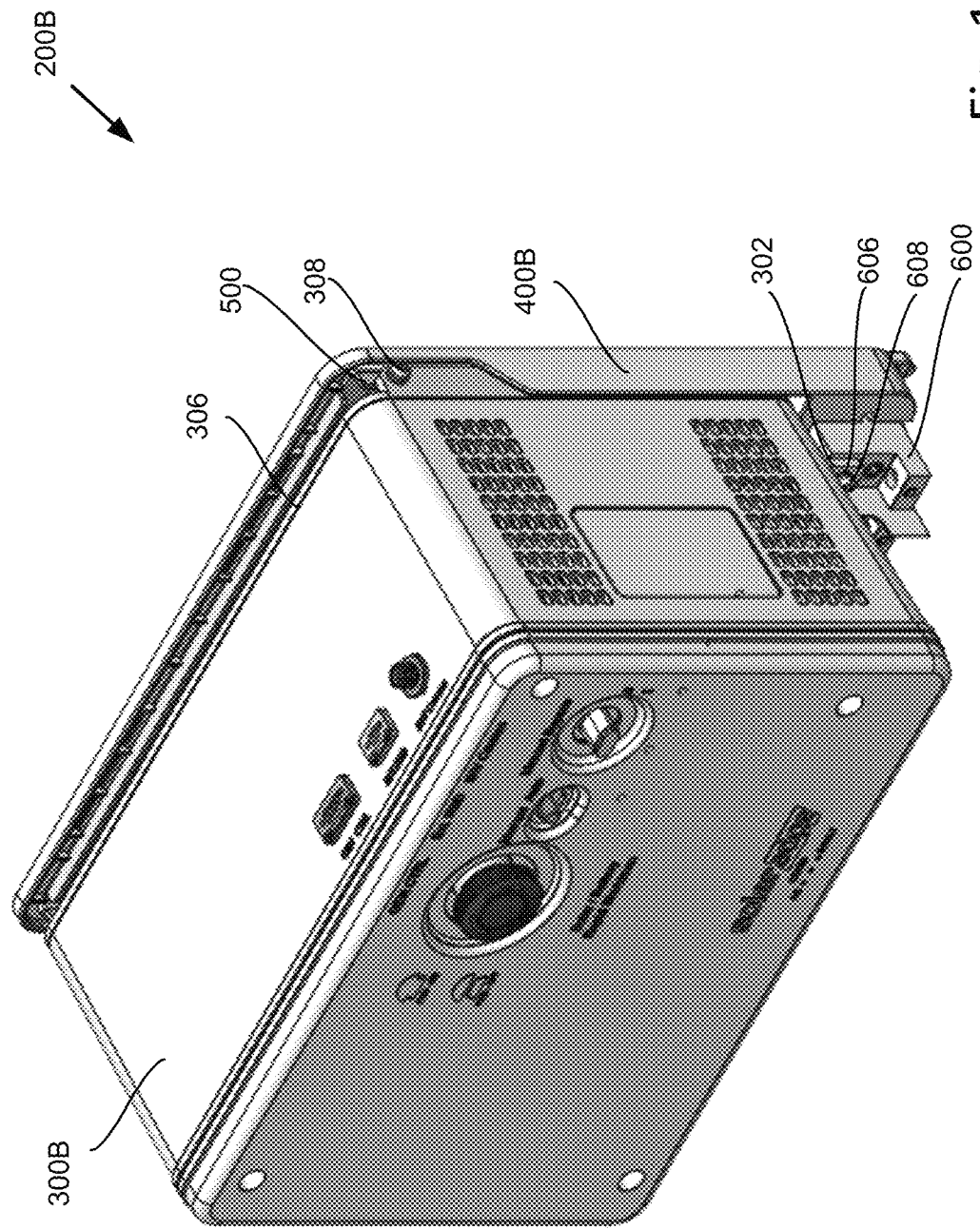

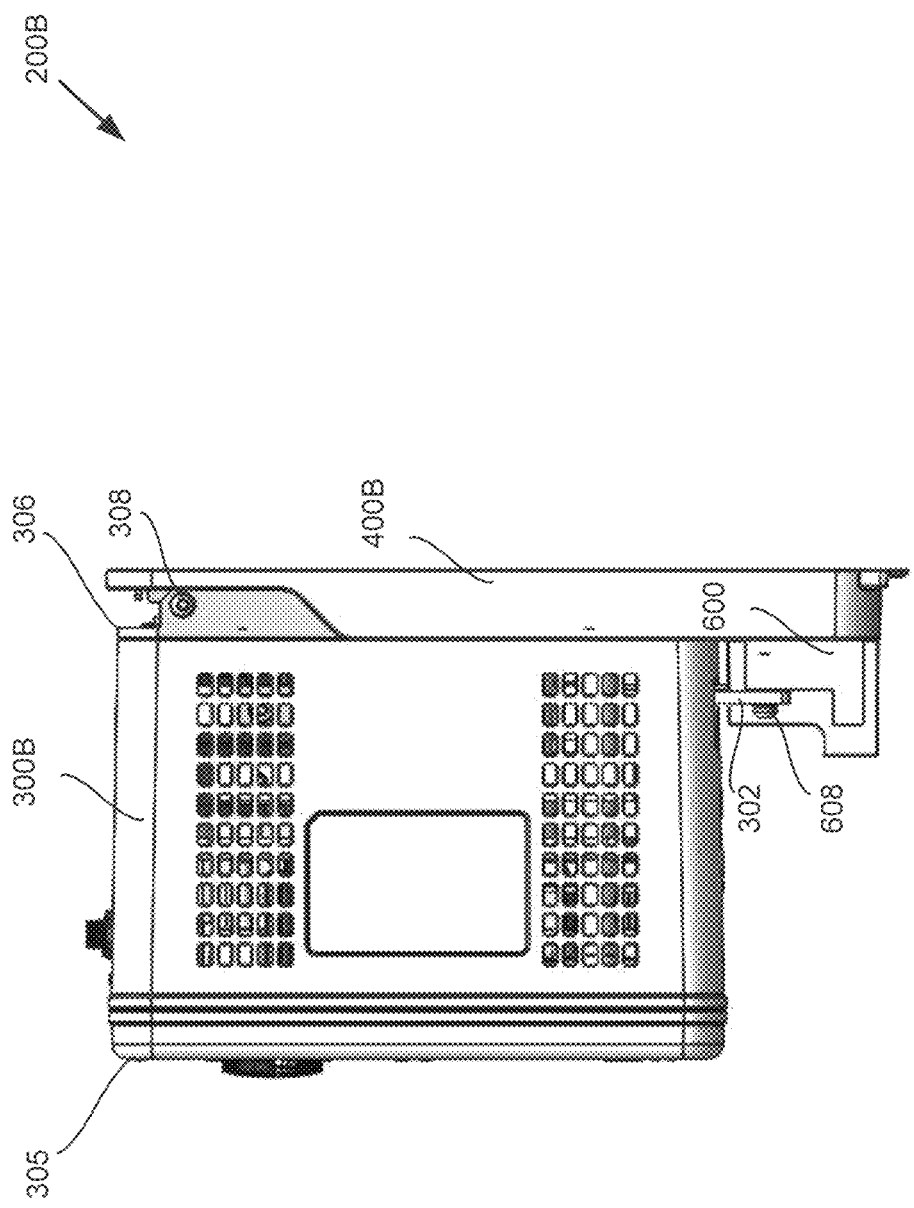

BACKUP SYSTEM, BACKUP INTERFACE MODULE, AND BASE PLATE

CROSS-REFERENCE TO RELATED APPLICATIONS

This application claims priority to U.S. Provisional Patent Application No. 63/117,969, entitled "Backup System" and filed on Nov. 24, 2020 and U.S. Provisional Patent Application No. 63/117,804, entitled "Backup Interface Module And Base Plate" and filed on Nov. 24, 2020, each of which is incorporated by reference herein in its entirety.

BACKGROUND

Power distribution from an electrical grid to one or more loads within a residence may pass through a main circuit breaker and ground fault protection breakers, where the main circuit breaker may limit the amount of total current (or corresponding power) that all loads in the residence consume at once. When power is not provided by the electrical grid, such as in the case of a power outage or power disconnection, the loads may fail to operate, including critical loads such as a heating load during the winter months. In such a no-backup configuration, the loads will cease to operate and all electrical power at the residence may be shut down. A backup power source may provide power to the residence, thereby allowing un-interrupted operation of the loads. When the backup power is insufficient to provide power for all loads at the residence operating simultaneously, only a part of the loads at the residence may be connected to the backup power source in a partial backup configuration. When the backup power is sufficient to provide power for all loads at the residence operating simultaneously, all of the loads at the residence may be connected to the backup power source in a full backup configuration.

When an electrical utility outage occurs, it is useful for critical loads such as pumps, security systems, refrigerators, and electronics to have a backup source of power available (e.g., a generator or a backup electrical power source). A generator is a device that converts motive power (e.g., mechanical energy) into electrical power for use in an external circuit. Sources of mechanical energy may include steam turbines, gas turbines, water turbines, internal combustion engines, wind turbines, and even hand cranks. Examples of backup electrical power sources include solar panels, wind turbines, batteries, and super-capacitors.

SUMMARY

The following summary presents a simplified summary of certain features. The summary is not an extensive overview and is not intended to identify key or critical elements.

One or more electrical loads may be collected into groups (hereinafter referred to as "load groups") where each load group may have different priorities for backup power when grid power is unavailable. For example, a first load group may be a group of critical loads that require backup power, and a second load group may be non-critical and not require backup power. An interface enclosure for partially or fully supplying power to the one or more load groups may be described herein. The interface enclosure may be a backup interface enclosure including electric circuitry (e.g., one or more relays, one or more detection circuits, one or more power devices, etc.) for disconnecting one or more loads from a connection to the utility grid in the case of a shutdown of the utility grid (e.g., when the utility grid is not providing power). The interface enclosure may disconnect (e.g., in the case of shutdown) one or more load groups so that the one or more load groups may be safely connected to one or more sources of backup power (e.g., one or more photovoltaic (PV) sources, or one or more electrical storage devices such as batteries). This may have the advantage of allowing the one or more sources of backup power and the one or more loads to form a local grid (e.g., a "microgrid") separate from the utility grid. When the utility grid returns to normal, and is available for supplying power again to the loads, the interface enclosure may connect the loads to the utility grid.

The interface enclosure may include a housing for electric circuitry, where the housing may be a clam-shell design including a base plate and a backup interface module. The base plate may comprise a frame, one or more detachable hinges, and/or two or more multi-terminals. Each multi-terminal may include one or more terminal connections, where each terminal connection may be configured for connecting the backup interface module to the base plate (mechanically or electrically), connecting load groups, and/or connecting power sources. The base plate may serve as a mount for the backup interface module, and the backup interface module may include electronics for managing the backup interface connections (e.g., circuitry, relays, communication interfaces/devices, cooling devices, etc.). The base plate may be configured to support the backup interface module, serve as a part of the interface enclosure protecting the circuitry, and/or connect the backup interface module to a mounting. The base plate may be sized or arranged for the interface enclosure to be located inside of or connected to the mounting. The mounting may contain a plurality of load groups. The mounting may be an electrical distribution panel.

The backup interface module may include lugs protruding from the backup interface module, which may be configured to mechanically connect or electrically connect the backup interface module to the multi-terminals of the base plate. The backup interface module may include electronics (e.g., the backup interface module may comprise the circuitry and components found in a power device case). The backup interface module may be mechanically connected to the base plate using one or more detachable hinge connections. A detachable hinge connection may include a portion of the backup interface module (e.g., a protuberance or an axis) and a curved track. The one or more curved tracks may be part of or connected to the base plate, and may be arranged to receive the axis. The detachable hinge connection may be a hinged connection that allows the backup interface module to rotate relative to the base plate along the axis. For example, the curved track may be part of, or connected to, the frame of the base plate and an axis protuberance may be connected to the backup interface module. For example, the axis protuberance may be part of or connected to the frame of the base plate and the curved track may be connected to the backup interface module.

The base plate may include a plurality of multi-terminals. The multi-terminals may be arranged to connect to one or more load groups, power sources, power devices, and/or other multi-terminals, etc. Each load group that is connected to the multi-terminals may be disconnected from the utility grid and connected to the one or more sources of backup power in the case of a utility grid shutdown. Connecting only some of the load groups to the multi-terminals may provide a partial backup to only those connected load groups (e.g., one or more load groups that are connected to critical loads). Connecting all of the load groups to the multi-terminals may provide a full backup to the connected load groups (e.g., one or more load groups that are connected to critical loads and one or more load groups that are connected to non-critical loads). Connecting none of the load groups to the multi-terminals may provide no backup to the one or more multi-terminals. This arrangement may allow field-configurable connection configurations for operations of the backup interface enclosure and the electrical supply system as no backup, partial backup, or full backup.

In some examples, connecting the backup interface module to the base plate may complete one or more connections between the interface enclosure and one or more other electrical or electronic elements of an electrical network, such as elements of a power generation system panel.

A backup interface module may be configured to be connected to a base, wherein the base may have a base plate with configurable connectors. The base plate may be configured by connecting the configurable connectors to one another. The base plate may be configured by connecting a backup interface module to the base plate. By changing a wiring configuration and/or connecting a backup interface module including relays and/or other switching circuitry to the base plate, various backup configurations may be supported. For example, part, none or all of electrical loads connected to the configurable connectors may be connected to a backup power source in case of an outage of a primary power source. Selection of a particular backup configuration may be manual (e.g., pre-wiring) or automatic (e.g., by a controller configured to select a backup configuration), and may depend on current load and/or backup power production levels.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 2 shows an example interface enclosure.

FIG. 3B shows an example back view of the backup interface module of the interface enclosure.

FIG. 3C shows an example side view of the backup interface module of the interface enclosure.

FIG. 4A shows an example front view of a base plate of the interface enclosure.

FIG. 4B shows an example back view of the base plate of the interface enclosure.

FIG. 4C shows an example side view of the base plate of the interface enclosure.

FIG. 5B shows an example side view of a hinged connection of the interface enclosure.

FIG. 5C shows an example side view of a different curved track of the interface enclosure.

FIG. 10 shows an example bottom perspective view of a three connector multi-terminal of the base plate.

FIG. 11 shows an example bottom view of a three connector multi-terminal of the base plate.

FIG. 12A shows an example front view of an interface enclosure.

FIG. 13 shows an example perspective top view of an interface enclosure.

FIG. 14 shows an example side view of an interface enclosure.

DETAILED DESCRIPTION

Figure 1:
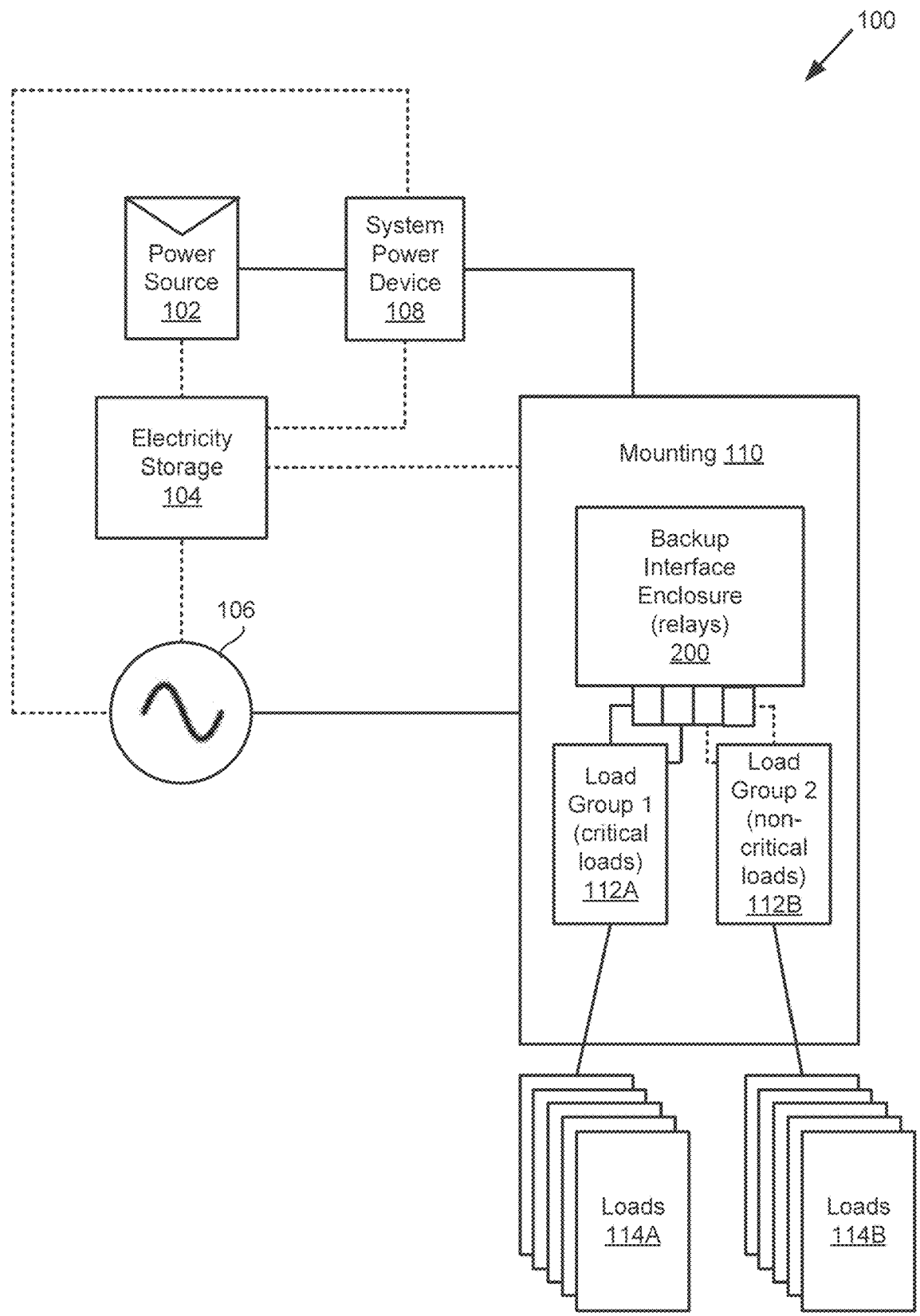
FIG. 1 shows an example electrical supply system with an interface enclosure.

An interface enclosure is described herein. The interface enclosure may be a backup interface enclosure including electric circuitry (e.g., one or more relays, one or more detection circuits, one or more power devices, etc.) for disconnecting one or more load groups from a connection to the utility grid when the utility grid is not providing power (e.g., in the case of a shutdown of the utility grid or a blackout). In such a scenario, the interface enclosure may disconnect one or more load groups so that the one or more load groups may be connected to one or more sources of backup power (e.g., one or more photovoltaic (PV) sources, or one or more electrical storage devices such as batteries).

This may allow the one or more sources of backup power and the one or more loads to form a local grid (e.g., a "microgrid") isolated or separate from the utility grid (e.g., until the utility grid is available again). The interface enclosure may be located inside a mounting.

The term "mounting" may refer to an electrical distribution panel/board. Electrical power generation systems, including photovoltaic (PV) systems, may be electrically connected to building loads and feed excess electrical power to the electrical grid, through a circuit breaker/distribution board, a combination service entrance device (CSED), a main breaker box, a load center, an all-in-one electrical distribution board, and/or the like. As used herein, the terms circuit breaker/distribution panel/board, combination service entrance device (CSED), main breaker box, distribution board, meter box, circuit box, electrical box, load center, and/or the like, may be used interchangeably, and mean one or more building electrical supply boxes comprising electrical supply components, including utility/supply/load conductors (e.g., wires or busbars), one or more utility side protection units, one or more power/energy meters, one or more main circuit protection breakers, load side circuit breakers, and/or the like. The building electrical supply components may be located in one or more enclosures or boxes, where some of the boxes may be adjacent. For example, a single all-in-one electrical panel box may be partitioned into a meter enclosure, a main circuit breaker enclosure, a load circuit breakers enclosure, and/or the like. The mounting may contain a plurality of load groups.

The interface enclosure may include a base plate that serves as a mount for the interface enclosure. The base plate may be arranged to support the backup interface module and serve as a base. The base plate may also be sized and arranged for the interface enclosure to be located inside of a mounting. For example, the base plate of the interface enclosure may include a frame for mounting the base plate in an electrical distribution panel.

In some examples, the interface enclosure may also include a backup interface module for jumpers, relays, electrical circuitry, etc. The backup interface module may be configured with a detachable hinge integrated into the base plate and backup interface module, where each hinge includes an axis and one or more curved tracks. The curved tracks may be part of or connected to the base plate or the backup interface module. The curved tracks may be arranged to receive a portion of the backup interface module or base plate. The curved track may have an open end (e.g., that acts as a funnel to accept the axis), a first curved portion of the track with a large radius of curvature, and/or a second part portion of the track with a smaller radius (e.g., a hook or the letter "J"). The detachable hinge may be a pivoting connection that allows the backup interface module to be rotated relative to the base plate along a connection axis. For example, the curved track may be part of, or connected to, the frame of the base plate.

The base plate may include a plurality of multi-terminals. The multi-terminals may be arranged to connect to one or more load groups, power sources, power devices, other multi-terminals, etc. Each load group that is connected to the multi-terminals may be disconnected from the utility grid and connected to the one or more sources of backup power in the case of a utility grid shutdown. Connecting only some of the load groups to the multi-terminals may provide a partial backup to only those connected load groups (e.g., one or more load groups that are connected to critical loads). Connecting all of the load groups to the multi-terminals may provide a partial or full backup to the connected load groups (e.g., one or more load groups that are connected to critical loads or one or more load groups that are connected to non-critical loads). Connecting none of the load groups to the multi-terminals may provide no backup to the one or more multi-terminals. In applications without backup support for load groups, load groups may be connected to the multi-terminals and jumpers may be installed to short between the load groups and one or more power sources. The jumpers may be electrical cables connecting one multi-terminal to another. The jumpers may be installed in the backup interface module and connect the multi-terminals, such as when the backup interface module is mechanically and electrically connected to the base plate. The multi-terminals, jumpers, and/or cover may allow configuring the operation of the backup interface enclosure or the electrical supply system to support different backup configurations. For example, electrically connecting the multi-terminals of the grid and load groups may provide a no-backup configuration. Electrically connecting some of the load groups to the grid through a relay, and other load groups to the grid using a relay, may provide a partial-backup configuration. Electrically connecting all of the load groups to the grid through a relay may provide a full-backup configuration. Electrically connecting all of the load groups to the grid (e.g., each through a separate relay) may provide a dynamic full-backup configuration (e.g., wherein load groups may be connected or disconnected based on available power sources, expected consumption, or expected time to grid power availability).

In some examples, connecting the backup interface module to the base plate may complete one or more connections between the interface enclosure and one or more other elements of the electrical supply system.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, power source 102 and system power device 108, which are shown as separate units (shown, for example, in FIG. 1), may have their functionalities and/or components combined into a single unit.

It is also noted that like references in the various figures may refer to like elements throughout this disclosure. Similar reference numbers may also connote similarities between elements. For example, it is to be understood that backup interface enclosure 200 shown in FIG. 1 may be similar to, or the same as, other interface enclosures described and shown herein, and vice versa. Throughout this disclosure certain general references may be used to refer to any of the specific related elements. For example, backup interface enclosure 200 may refer to any of the various interface enclosures.

It is also noted that all numerical values given in the examples of the description are provided for purposes of example only and are by no means binding.

The terms "substantially" and "about" are used herein to indicate variations that are equivalent for an intended purpose or function (e.g., within a permissible variation range). Certain values or ranges of values are presented herein with numerical values being preceded by the terms "substantially" and "about". The terms "substantially" and "about"

are used herein to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides a substantial equivalent of the specifically recited number.

FIG. 1 shows an example of an electrical supply system 100 with an interface enclosure 200.

Electrical supply system 100 may include one or more power sources 102. As an example, the one or more power sources 102 may be one or more photovoltaic (PV) generators. For example, power sources 102 may be one or more photovoltaic cells, strings of substrings of photovoltaic cells, and/or strings of photovoltaic panels/modules. Although power sources are described herein in the context of PV generators, the term power source may include other types of appropriate power sources, such as wind turbines, hydro-turbines, fuel cells, etc.

The one or more power sources 102 may be connected via one or more system power devices 108 to one or more mountings 110. The one or more system power devices 108 may be, for example, one or more: DC to DC converters (e.g., buck converters, boost converters, buck/boost converters, buck+boost converters, etc.), DC to AC inverters, combiner and/or monitoring boxes, etc. The one or more system power devices 108 may comprise an inverter for one or more phases (e.g., one phase inverter, two phase inverter, three-phase inverter, etc.), and may comprise lines or phases that are not shown herein for the sake of simplicity.

The one or more power sources may also be connected to one or more electricity storage devices 104 (e.g., batteries). The one or more electricity storage devices 104 may be connected to one or more mountings 110 directly or via one or more system power devices 108. The one or more electricity storage devices 104 may be connected to the utility grid 106.

While two load groups are shown in the example of FIG. 1, any appropriate number of load groups may be possible. Each of load groups 112A and 112B may be one or more electrical loads 114, such as an appliance, a heater, a pump, an air conditioning unit, etc. Each of the load groups 112A and 112B may be a sub load group, sub panel, split panel, etc. Each mounting 110 may be connected to the utility grid 106. The mounting 110 may contain a plurality of load groups 112A and 112B. The mounting 110 may be an electrical distribution panel. Each load group 112A and 112B may receive a priority label. Each of the priority labels may be different or the same as another priority label. As an example, load group 112A may be connected to critical loads and given a "high priority" priority label or an "always backup" priority label. Load group 112B may be connected to non-critical loads and given a "lower priority" priority label or a "may not need backup" priority label.

A backup interface enclosure 200 may be mounted or otherwise housed inside or in proximity to the mounting 110. Backup interface enclosure 200 may be connected to one or more of the load groups 112A and 112B. Backup interface enclosure 200 may be arranged to provide backup power to the one or more load groups 112A and/or 112B that are connected to the backup interface enclosure. The backup interface enclosure 200 may include one or more relays, detection circuits, and/or power devices. The one or more relays may be arranged to disconnect the one or more load groups 112A and/or 112B from the utility grid 106 (e.g., in the case the utility grid 106 is not providing power due to a utility grid shutdown). The one or more detection circuits may be arranged to detect whether the utility grid 106 is, or is not, providing power. The one or more power devices may be arranged to convert power. For example, if the utility grid 106 is shut down and not providing power, the backup interface enclosure 200 may disconnect one or more of the load groups 112A and/or 112B from the utility grid, which may provide backup power to the one or more of the load groups 112A and/or 112B from one or more backup power sources. The one or more backup power sources may be the one or more power sources 102 and/or the one or more electricity storage devices 104.

How the load groups 112A and 112B are connected to the backup interface enclosure 200 may at least partially determine whether the backup interface enclosure 200 provides full backup, partial backup, or no backup. For example, if both load groups 112A and 112B are connected to the backup interface enclosure 200, then the backup interface enclosure 200 may provide full backup. If only one of the load groups 112A or 112B is connected to the backup interface enclosure 200, then the backup interface enclosure 200 may provide partial backup to the connected load group 112A or 112B. If both load groups 112A and 112B are not connected to the backup interface enclosure 200, then the backup interface enclosure 200 may provide no backup. For example, the load groups 112A and 112B and utility grid 106 may remain connected to a base plate 400A (as may be shown, for example, in FIG. 2) of the backup interface enclosure 200, and (e.g., depending on what type of backup is arranged) there may be jumpers and/or relays connected. For example, when there is no backup arranged, there may be only jumpers connected to the base plate 400A of the backup interface enclosure 200. When there is partial backup arranged, both jumpers and relays may be connected to the base plate 400A of the backup interface enclosure 200. And when full backup is arranged, all of the load groups 112A and 112B may have relays connected to the base plate 400A that are configured to disconnect the load groups 112A and 112B from the utility grid 106 (e.g., when there is no grid power).

Figure 3A:
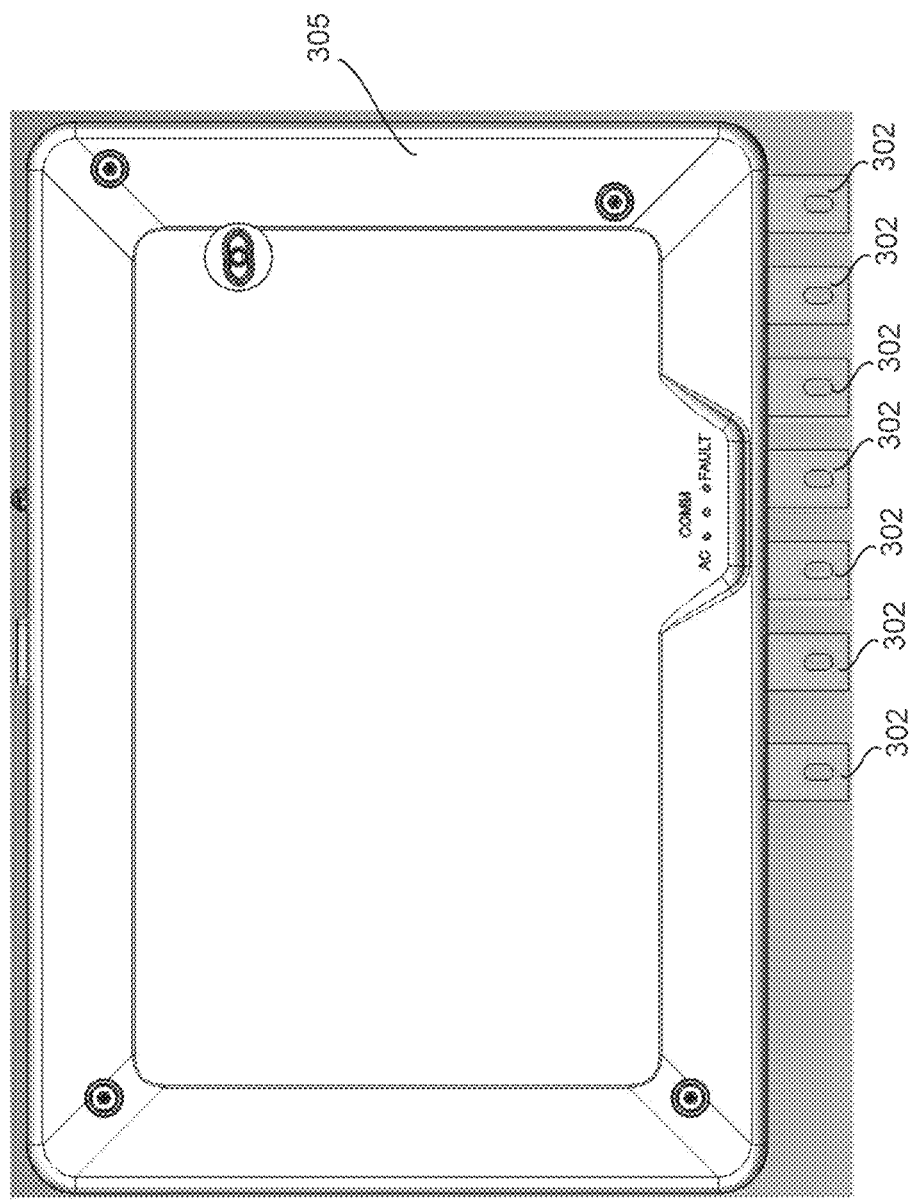
FIG. 3A shows an example front view of a backup interface module of the interface enclosure.
Figure 3D:
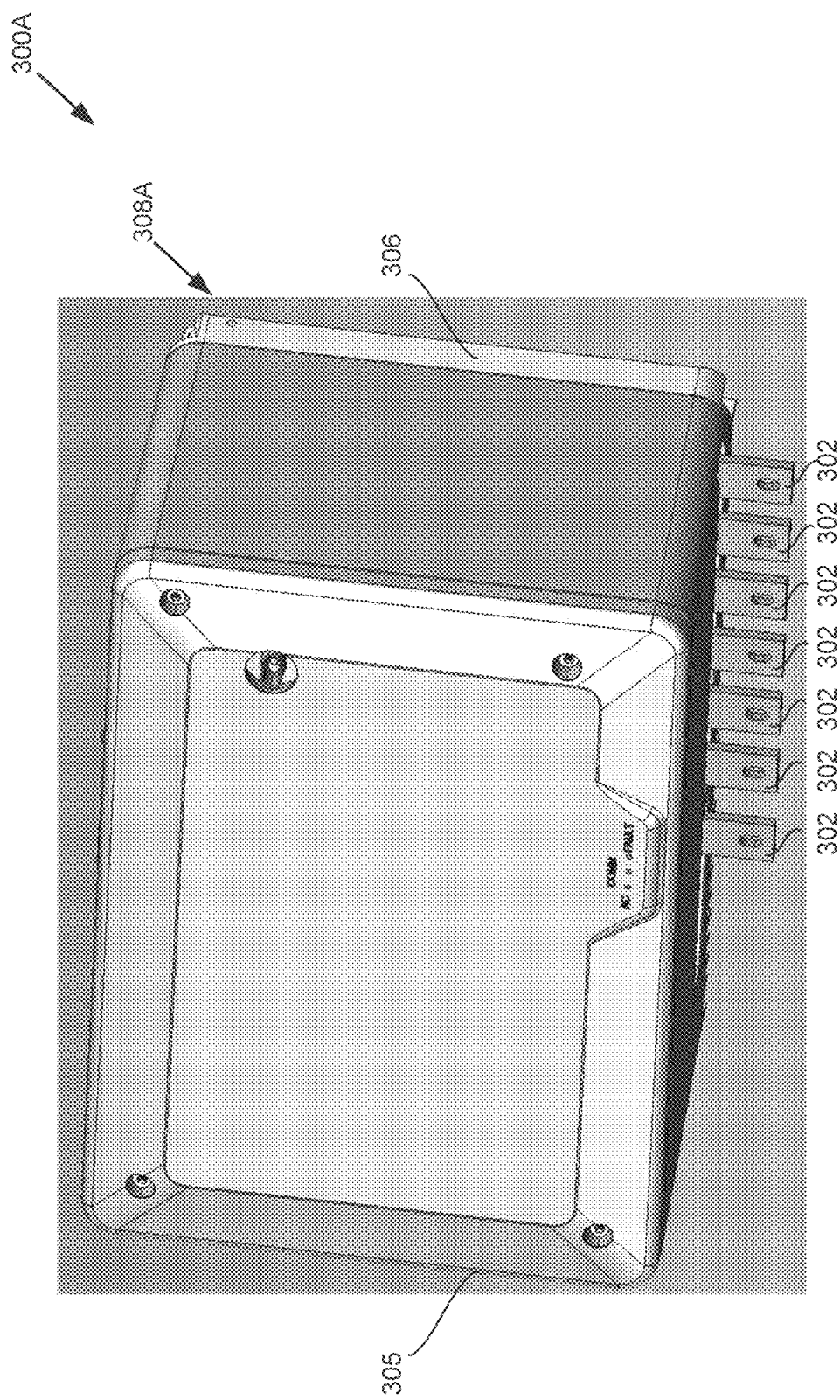
FIG. 3D shows an example front perspective view of the backup interface module of the interface enclosure.

FIG. 2 shows an example of a backup interface enclosure 200A. Backup interface enclosure 200A may include a backup interface module 300A and a base plate 400A. Backup interface enclosure 200A may also be referred to as a "cover". Base plate 400A may also be referred to as a "base". Backup interface module 300A may contain electronic circuitry (e.g., one or more relays, detection circuits, power devices, transformers, automatic transfer relays, cooling devices, etc.). Backup interface module 300A may be mounted to base plate 400A. Base plate 400A may be mounted inside an electrical mounting 110. Base plate 400A may include a plurality of multi-terminals 600. Each of the multi-terminals 600 may include a plurality of terminal connectors 606 (as may be shown, for example, in FIGS. 6A to 11). The base plate 400A of FIG. 2 may have a plurality of two connector multi-terminals 602 and a plurality of three connector multi-terminals 603. One or more of the multi-terminals 600 may be connected to the backup interface module 300A via electromechanical connectors 302 (as may be shown, for example, in FIG. 3A).

Reference is now made to FIGS. 3A to 3D, which show examples of a backup interface module 300A according to examples of the present subject matter. Backup interface module 300A may include one or more electromechanical connectors 302 (e.g., lugs), a front cover 305, a back cover 306 (as may be shown, for example, in FIG. 3B), one or more heat dispersing elements 304 (as may be shown, for example, in FIG. 3B), and/or one or more protuberances 308A (as may be shown, for example, in FIG. 3B). Electronic circuitry of the backup interface module 300A may be housed inside the backup interface module 300A. For example, electronic circuitry of the backup interface module 300A may be housed between the front cover 305 and the back cover 306 of the backup interface module 300A.

The electromechanical connectors 302 may be cable lugs or wire lugs that are arranged to provide mechanical or electrical connections between elements of the electrical supply system 100. The electromechanical connectors 302 may facilitate a connection between electronics of the backup interface module 300A and one or more multi-terminals 600 of the base plate 400. For example, the electromechanical connectors 302 may each be connected to a corresponding terminal connector 606 of a multi-terminal. As an example, an electromechanical connector 302 may be connected to a corresponding terminal connector 606 using a fastening element 608 (as may be shown, for example, in FIG. 16). Fastening element 608 may be a metallic screw or bolt configured to electromechanically connect between the multi-terminals 600 of the base plate and the backup interface module 300A. One or more of the multi-terminals 600 of the base plate 400A may be connected to one or more of the load groups 112A and 112B and/or to one or more other multi-terminals 600. Fastening elements 608 and electromechanical connector 302 may be arranged to pass relatively high current (e.g., between a power source and a load via one or more multi-terminals 600 and the backup interface module 300A). Fastening element 608 and electromechanical connectors 302 may provide a relatively reliable and relatively quick connection between the one or more multi-terminals 600 and the backup interface module 300A. Backup interface module 300A may include one or more corresponding electromechanical connectors housed inside the backup interface module 300A. The one or more corresponding electromechanical connectors may be connected to the electronic circuitry or one or more jumpers housed inside the backup interface module 300A. The one or more corresponding electromechanical connectors 302 may be connected to the electronic circuitry or one or more jumpers using one or more fastening elements housed inside the backup interface module 300A.

Electromechanical connectors 302 may also be referred to as "backup interface module terminals" or "cover terminals." Multi-terminals 600 may also be referred to as "base multi-terminals."

With reference to FIG. 3B, the one or more heat dispersing elements 304 may be configured to provide thermal heat dissipation. For example, the one or more heat dispersing elements 304 may be configured to provide dissipation of a thermal heat that is related to the electronics housed inside the backup interface module 300A. The one or more heat dispersing elements 304 may also be configured to provide mechanical stiffness to the back cover 306 of backup interface module 300A. For example, the one or more heat dispersing elements 304 may be one or more physical fins extending relatively perpendicularly from the back cover 306 of backup interface module 300A. The physical fins 304 may mechanically strengthen the back cover 306, and dissipate heat generated by electronics located in the backup interface module 300A.

The interface enclosure 200A may have both a back cover 306 of the backup interface module 300A as well as a base plate 400A (e.g., which may serve as a second "back cover" of the interface enclosure 200A).

Each of the one or more protuberances 308A may be arranged to be received by a corresponding curved track 500 (as may be shown, for example, in FIG. 5A) of the base plate 400A. The one or more protuberances 308A may be arranged to have an extending member portion (e.g., a protuberance) that is received in and guided by the curved track 500 until it reaches an end of the curved track 500. The end of the curved track 500 may be arranged to hold the given protuberance 308A relatively in place, but allow for a rotation of the given protuberance 308A along a rotational axis of the protuberance 308A. Curved track 500 together with protuberance 308A may also be referred to as a "hinge."

Figure 3E:
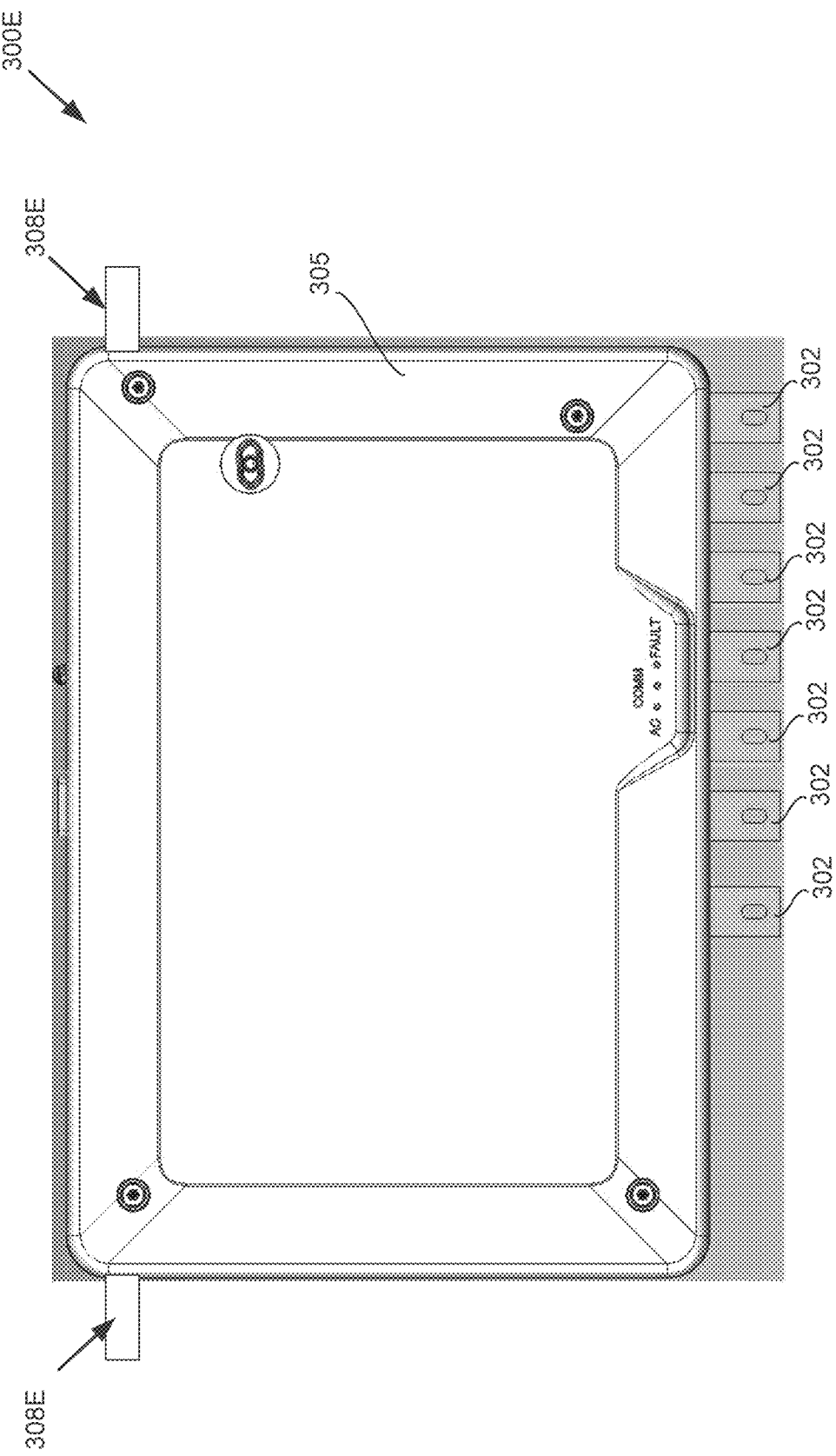
FIG. 3E shows an example front view of a different backup interface module of the interface enclosure.
Figure 4D:
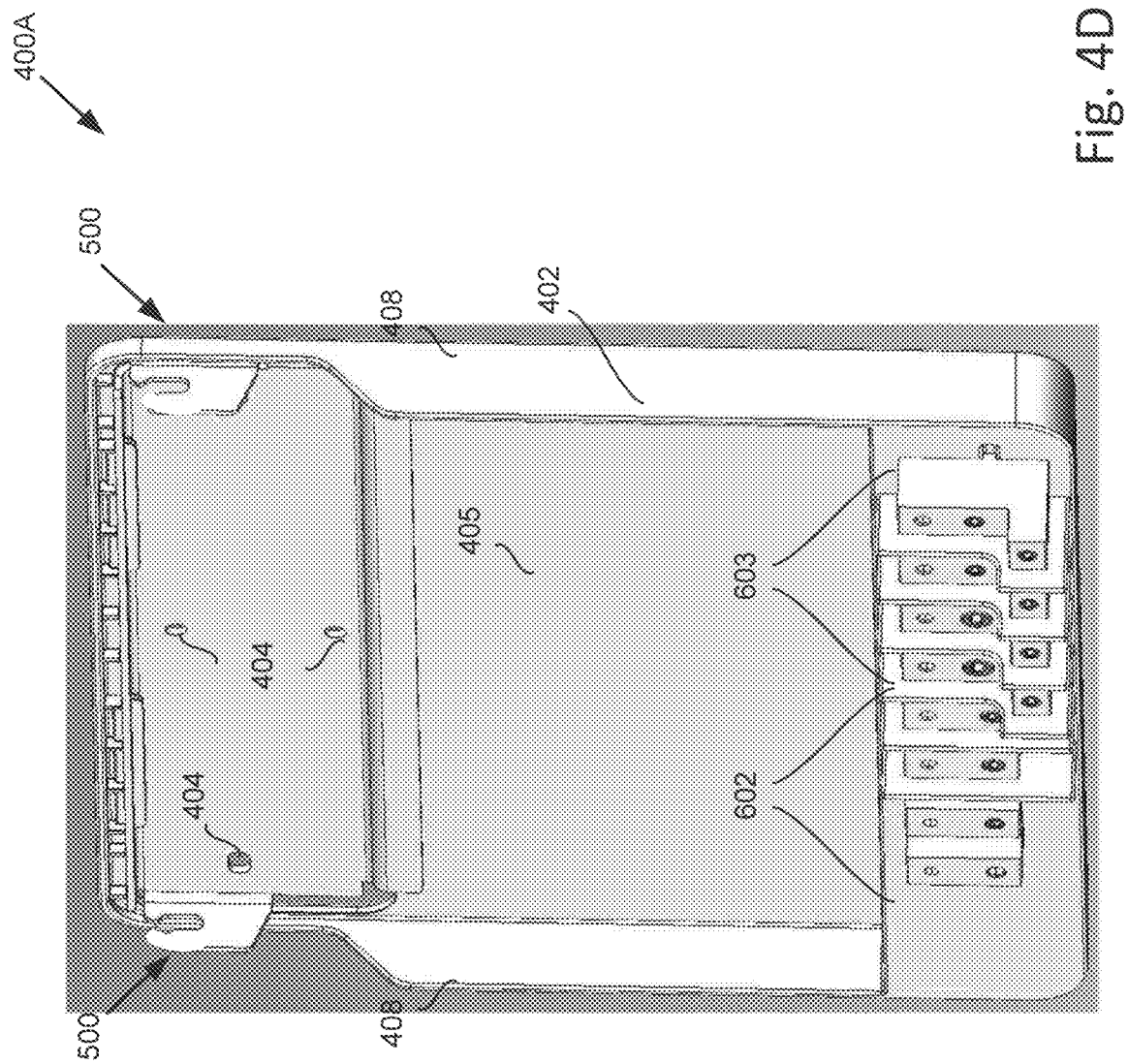
FIG. 4D shows an example front perspective view of the base plate of the interface enclosure.

Reference is now made to FIG. 3E, which shows a backup interface module 300E according to examples of the present subject matter. Backup interface module 300E may include one or more protuberances 308E that extend beyond the side walls of the backup interface module 300E.

Reference is now made to FIGS. 4A to 4D, which show examples of a base plate 400A according to examples of the present subject matter. Base plate 400A may include a plurality of multi-terminals 600, a frame 402, one or more frame mounting elements 404, a front 405, a back 406 (as may be shown, for example, in FIG. 4B), one or more sides 408 (as may be shown, for example, in FIG. 4C), and/or one or more curved tracks 500.

With reference to FIG. 4A, base plate 400A may include a rail 900 that has an aperture 902 formed by a pair of rail members 904. Rail 900 may be arranged to support one or more multi-terminals 600. The one or more multi-terminals 600 may be secured to base plate 400A by connecting a support member 708 (as may be shown, for example, in FIGS. 7A-10) to the rail 900 by placing the support member 708 into the aperture 902.

Figure 6C:
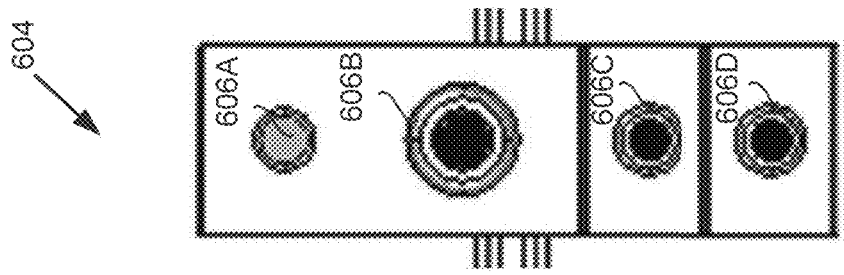
FIG. 6C shows an example four connector multi-terminal of the base plate.
Figure 6B:
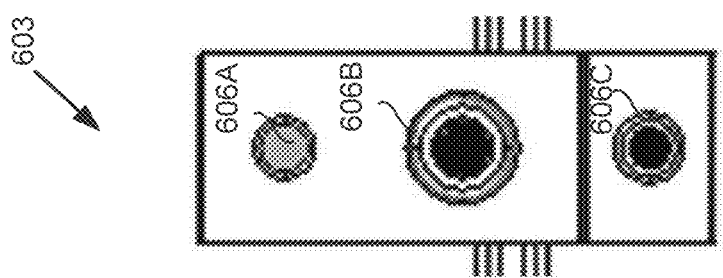
FIG. 6B shows an example three connector multi-terminal of the base plate.

The plurality of multi-terminals 600 may include a plurality of two connector multi-terminals 602 with two terminal connectors 606 (as may be shown, for example, in FIG. 6A) or a plurality of three connector multi-terminals 603 with three terminal connectors 606 (as may be shown, for example, in FIG. 6B). One or more of the multi-terminals 600 may be quick connect terminals. For example, one or more of the multi-terminals 600 may comprise a socket arranged to receive a plug having preset wiring arrangements. The plug or plugs may be used to determine an operation of the backup interface enclosure 200. One or more terminal connectors 606 of a multi-terminal 600 may be quick connect terminals, and one or more terminal connectors 606 of that same multi-terminal 600 may be non-quick connect terminals. For example, a non-quick connect terminal may include a fastening element such as a screw or a bolt that is fastened to the terminal connector 606 of the multi-terminal 600 to secure a connection to the multi-terminal 600.

The base plate 400A may include at least three multi-terminals 600, where each of those at least three multi-terminals 600 has two or more terminal connectors 606.

The frame 402 may be sized and arranged to fit inside a mounting 110. For example, the frame 402 may be configured to mechanically connect within the mounting 110.

The one or more frame mounting elements 404 may be one or more apertures sized and arranged to help connect the base plate 400A to a surface (e.g., a surface of the mounting 110). For example, the one or more frame mounting elements 404 may be used to secure the frame 402 to the surface using any appropriate additional connection elements (e.g., one or more screws, bolts, nails, etc.).

The one or more sides 408 may extend relatively perpendicularly from the front 405 of the frame 402. In some examples, each curved track 500 is located on, or attached to, one of the sides 408 of the frame 402 of the base plate 400A.

Each of the one or more curved tracks 500 may be sized and arranged to receive and hold a protuberance 308 of the backup interface module 300A. For example, the curved track 500 of a base plate 400A may be configured for accepting a protuberance 308 of the backup interface module 300A to form a hinge. The curved track 500 may be configured for aligning the cover terminals 302 with the base multi-terminals 600. For example, when the one or more protuberances 308 of the backup interface module 300A are received by the curved track 500 of the base plate 400A it may help align one or more electromechanical connectors 302 of the backup interface module 300A with one or more terminal connectors 606 of one or more multi-terminals 600 of the base plate 400A.

Figure 5A:
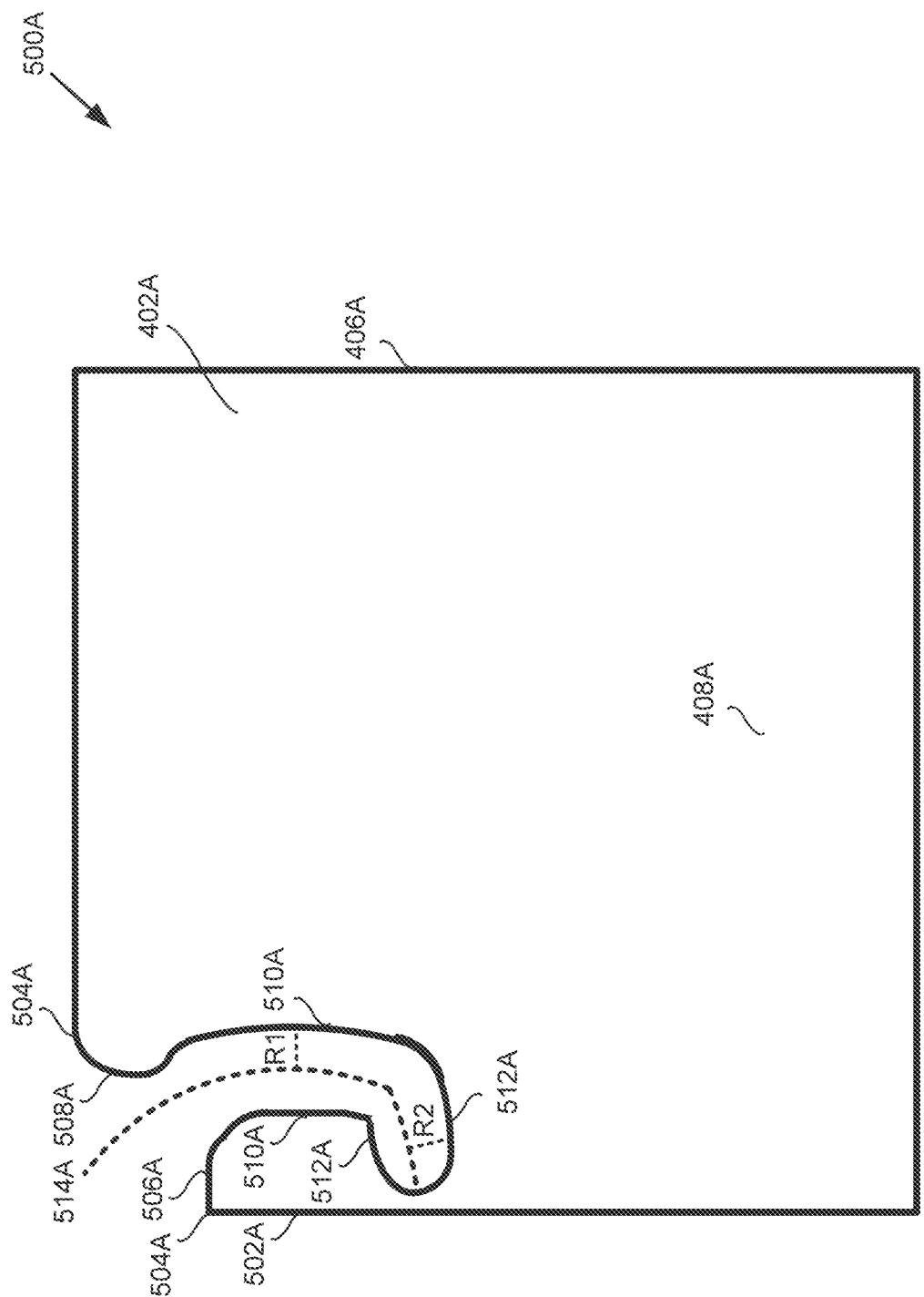
FIG. 5A shows an example side view of a curved track of the interface enclosure.

Reference is now made to FIGS. 5A and 5B, which show examples of a curved track 500A according to examples of the present subject matter. Curved track 500A may include a tab 502A, a funnel region 504A, a curved central track region 510A, a curved end track region 512A, and/or a track path 514A.

Tab 502A may extend from a portion of the side 408A of frame 402A. Tab 502A may have one or more convex curved portions that together with one or more complementary, correlated concave curved portions form a gap (e.g., that may be arranged to serve as a slot for a guided member portion of the backup interface module 300A to be fitted into and slid along). This may provide a hinged connection that may allow the backup interface module 300A to rotate relative to the base plate 400A along a rotational axis of the connection.

Funnel region 504A may include a first edge 506A and a second edge 508A. In some examples, funnel region 504A may be defined by the first edge 506A and the second edge 508A. First edge 506A may be part of tab 502A and second edge 508A may be part of the side 408A of frame 402A. The funnel region 504A may be connected to the curved central track region 510A. A distance between the two edges 506A and 508A may increase as a distance from the curved central track 510A towards the widening mouth of the funnel region 504A increases. The wide mouth of the funnel region 510A may help the curved track 500A to more easily receive the protuberance 308 of the backup interface module 300. In some examples, one or both of the edges 506A and 508A may be curved edges. The two edges 506A and 508A may be non-parallel edges.

The curved central region 510A may be connected to the curved end track region 512A. The curved central region 510A may have a first radius R1, and the curved end track region may have a second radius R2. The radius R2 of the curved end track region 512A may be less than the radius R1 of the curved central track region 510A. For example, the radius R2 of the curved end track region 512A may be substantially less than the radius R1 of the curved central track region 510A (e.g., radius R2 may be at least 10% less than radius R1). For example, the radius R2 of the curved end track region 512A may be in a range of between about 5 mm to about 45 mm, and the radius R1 of the curved central track region 510A may be in a range of between about 20 mm to about 50 mm. As a further example, radius R2 may be about 10 mm and radius R1 may be about 30 mm. Radius R1 may also be sized in accordance with a protuberance 308 of the backup interface module 300 (e.g., according to a radius of the protuberance 308).

Funnel region 504A may include a first edge 506A and a second edge 508A. First edge 506A may be part of tab 502A and second edge 508A may be part of the side 408A of frame 402A. The funnel region 504A may be connected to the curved central track region 510A. A distance between the two edges 506A and 508A may increase as a distance from the curved central track 510A towards the widening mouth of the funnel region 504A increases. The wide mouth of the funnel region 510A may help the curved track 500A to more easily receive the protuberance 308 of the backup interface module 300.

Track path 514A may be the intended path for the protuberance 308 to be guided along the curved track 510A to connect the backup interface module 300 to the base plate 400. Connecting the backup interface module 300 to the base plate 400 may complete one or more connections between the interface enclosure 200 and one or more other elements of the electrical supply system 100.

FIG. 5B shows an example protuberance 308 inside the curved end track region 512 of the curved track 500, which may hingedly connect the backup interface module 300 to the base plate 400A.

Reference is now made to FIG. 5C, which shows a curved track 500B according to examples of the present subject matter. Curved track 500B may include a tab 502B, a funnel region 504B, a curved central track region 510B, a curved end track region 512B, and/or a track path 514B. Curved track 500B may include a funnel region 504B with one or more edges 506B and 508B that are straight and/or linear, not curved edges. The two edges 506B and 508B may be non-parallel edges. For example, the curved track 500A of FIGS. 5A and 5B may be similar to the shape of a "C" (C-shaped), and the curved track 500B of FIG. 5C may be similar to the shape of a "J" (J-shaped).

Figure 6A:
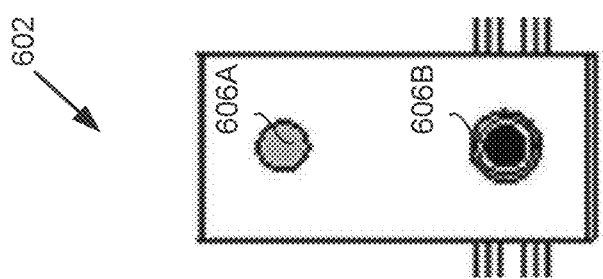
FIG. 6A shows an example two connector multi-terminal of the base plate.

FIGS. 6A to 6C show examples of multi-terminals 600 according to examples of the present subject matter.

Reference is now made to FIG. 6A, which shows a front view of an example two connector multi-terminal 602 according to examples of the present subject matter. Two connector multi-terminal 602 may include a first terminal connector 606A and a second terminal connector 606B. First terminal connector 606A may be a terminal connector 606 arranged to connect multi-terminal 602 to backup interface module 300A (e.g., using a fastening element 608 to secure the multi-terminal 600 to an electromechanical connector 302 of the backup interface module 300). Second terminal connector 606B may be a terminal connector 606 arranged to connect multi-terminal 602 to one or more other elements of the electrical supply system 100 (e.g., a backup interface module 300, a different multi-terminal 600, a power source 102, one or more load groups 112, etc.). Terminal connectors 606 may be quick connect terminals or terminals with one or more fastening elements. The terminal connectors 606 of a given multi-terminal 600 may be arranged so that each of the terminal connectors 606 is electrically connected to one another. For example, the multi-terminal 600 may include one or more electricity conducting elements arranged to electrically interconnect the terminal connectors 606 of the multi-terminal 600. As an example, a metallic portion or busbar may be housed inside multi-terminal 600 in proximity to the terminal connectors 606. As another example, one or more of the fastening elements 608 of the multi-terminal 600 may be arranged as electricity conducting elements arranged to electrically interconnect the terminal connectors 606 of the multi-terminal 600. As another example, one or more electrical conductors of one or more elements of the electrical supply system 100 may be arranged as electricity conducting elements arranged to electrically interconnect the terminal connectors 606 of the multi-terminal 600, such as jumpers. The term "jumper" may also be referred to as a "jump wire," "jumper wire," "jumper cable," or "cable." The term "jumper" may refer to one or more electrical wires, one or more electrical cables, one or more electrical busbars, etc., and/or any other appropriate electrical conductor used to make an electrical connection between a plurality of entities in an electrical circuit.

Reference is now made to FIG. 6B, which shows a front view of an example three connector multi-terminal 603 according to examples of the present subject matter. Three connector multi-terminal 603 may include a first terminal connector 606A, a second terminal connector 606B, and a third terminal connector 606C. First terminal connector 606A may be a terminal connector 606 arranged to connect multi-terminal 602 to backup interface module 300A (e.g., using a fastening element 608 to secure the multi-terminal 600 to an electromechanical connector 302 of the backup interface module 300A). Second terminal connector 606B and third terminal connector 606C may be terminal connectors 606 arranged to connect multi-terminal 602 to one or more other elements of the electrical supply system 100 (e.g., a backup interface module 300A, a different multi-terminal 600, a power source 102, one or more load groups 112, etc.). Terminal connectors 606 may be quick connect terminals or terminals with one or more fastening elements.

Reference is now made to FIG. 6C, which shows a front view of an example four connector multi-terminal 604 according to examples of the present subject matter. Four connector multi-terminal 604 may include a first terminal connector 606A, a second terminal connector 606B, a third terminal connector 606C, and a fourth terminal connector 606D. First terminal connector 606A may be a terminal connector 606 arranged to connect multi-terminal 602 to backup interface module 300A (e.g., using a fastening element 608 to secure the multi-terminal 600 to an electromechanical connector 302 of the backup interface module 300A). Second terminal connector 606B, third terminal connector 606C, and fourth terminal connector 606D may be terminal connectors 606 arranged to connect multi-terminal 602 to one or more other elements of the electrical supply system 100 (e.g., a backup interface module 300A, a different multi-terminal 600, a power source 102, one or more load groups 112, etc.). Terminal connectors 606 may be quick connect terminals or terminals with one or more fastening elements.

There may be N terminal connectors 606A ... 606N, where N is any appropriate number.

Each of the terminal connectors 606A-606N may be configured to electrically or mechanically connect to a power device (e.g., backup interface module 300A), a power source 102, a load group 112A or 112B, and/or at least one other terminal connector 606 of a different multi-terminal 600, etc.

For example, with reference to the three connector multi-terminal 603 of FIG. 6B, the first terminal connector 606A may be configured to electrically or mechanically connect to a power device, the second terminal connector 606B may be configured to connect to a power source 102 or a load group 112A or 112B, and the third terminal connector 606C may be configured to connect to at least one other terminal connector 606 of a different multi-terminal 600.

Figure 7B:
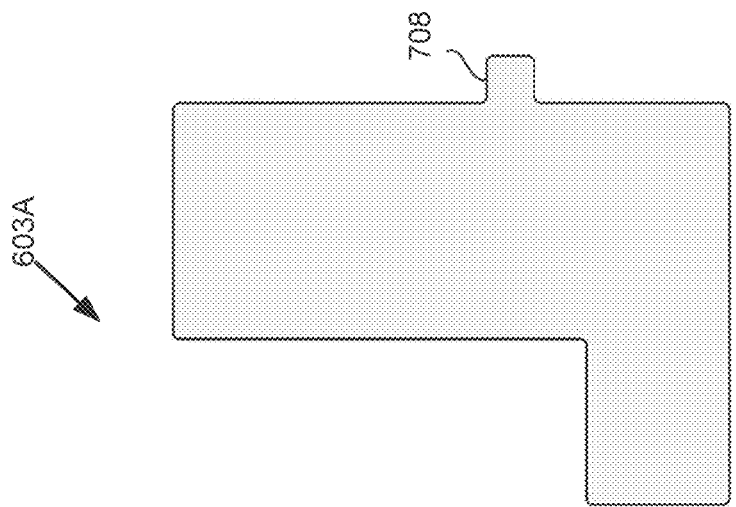
FIG. 7B shows an example side view of a three connector multi-terminal of the base plate.
Figure 7A:
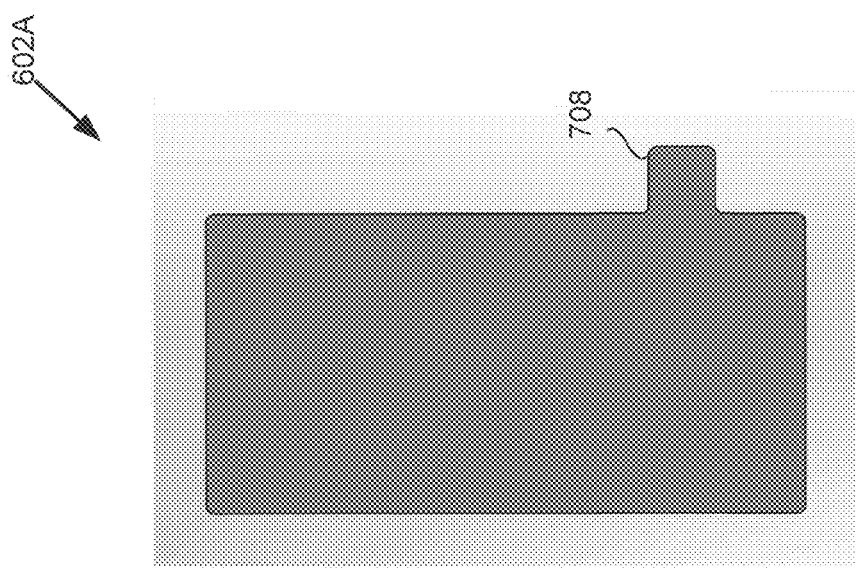
FIG. 7A shows an example side view of a two connector multi-terminal of the base plate.

FIGS. 7A and 7B show examples of multi-terminals 600 according to examples of the present subject matter.

Reference is now made to FIG. 7A, which shows a side view of an example two connector multi-terminal 602A according to examples of the present subject matter. Two connector multi-terminal 602A may include a first terminal connector 606A and a second terminal connector 606B. Two connector multi-terminal 602A may also include a support member 708 for connecting the multi-terminal 602A to the base plate 400A. For example, base plate 400A may include a rail 900 that has an aperture 902 formed by a pair of rail members 904 (as may be shown, for example, in FIGS. 4A and 12B). Multi-terminal 602A may be secured to base plate 400A by connecting the support member 708 to the rail 900 by placing the support member 708 into the aperture 902 (e.g., between the rail members 904). In some examples, the rail members 904 may be surfaces of a recess formed in the base plate 400A to form the aperture 902 of the rail 900.

Reference is now made to FIG. 7B, which shows a side view of an example three connector multi-terminal 603A according to examples of the present subject matter. Three connector multi-terminal 603A may include a first terminal connector 606A, a second terminal connector 606B, and a third terminal connector 606C. Three connector multi-terminal 603A may also include a support member 708 for connecting multi-terminal 603A to the base plate 400A.

Figure 8B:
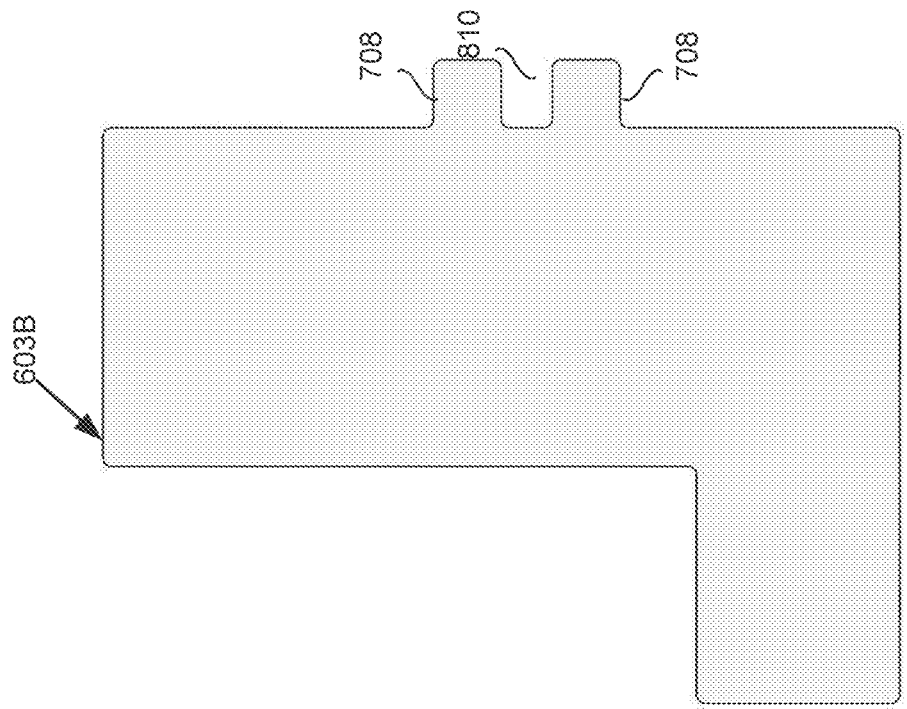
FIG. 8B shows an example side view of a different three connector multi-terminal of the base plate.
Figure 8A:
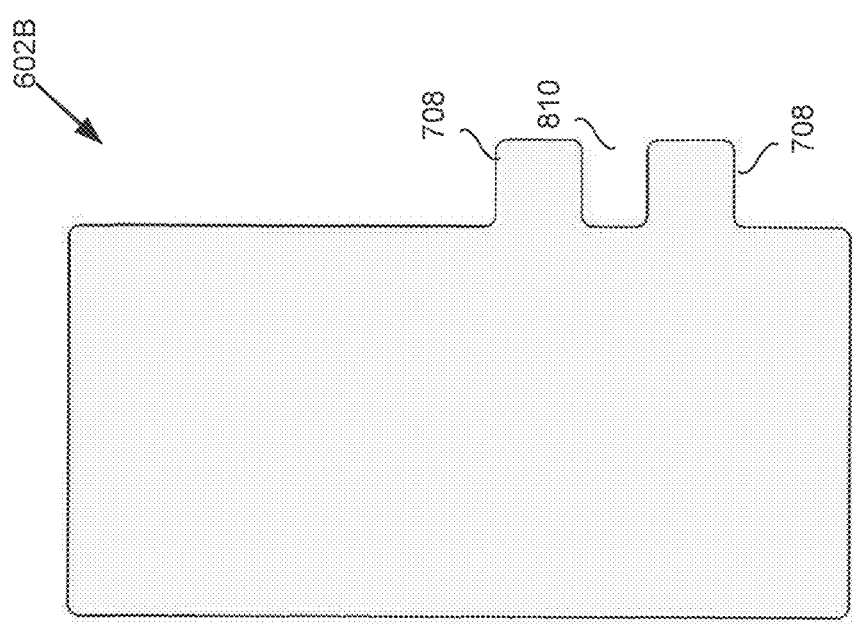
FIG. 8A shows an example side view of a different two connector multi-terminal of the base plate.

FIGS. 8A and 8B show examples of multi-terminals 600 according to examples of the present subject matter.

Reference is now made to FIG. 8A, which shows a side view of an example two connector multi-terminal 602B according to examples of the present subject matter. Two connector multi-terminal 602B may include a first terminal connector 606A and a second terminal connector 606B. Two connector multi-terminal 602B may also include a plurality of support members 708 for connecting multi-terminal 602B to the base plate 400A. For example, base plate 400A may include a plurality of rails 900 that each have an aperture 902 formed by a pair of rail members 904 (as may be shown, for example, in FIG. 12B). Multi-terminal 602B may be secured to base plate 400 by connecting the plurality of support members 708 to the plurality of rails 900 by placing each support member 708 into a corresponding aperture 902. There may be N support members 708, and N corresponding apertures 902, where N is any appropriate number. Each pair of support members 708 may form a support aperture 810. When multi-terminal 602B is connected to the base plate 400 one or more rail members 904 of the plurality of rails 900 may be placed into support aperture 810. The plurality of support members 708 and the one or more support apertures 810 may provide additional stability to the connection of the multi-terminal 602B to the base plate 400.

Reference is now made to FIG. 8B, which shows a side view of an example three connector multi-terminal 603B according to examples of the present subject matter. Three connector multi-terminal 603B may include a first terminal connector 606A, a second terminal connector 606B, and a third terminal connector 606C. Three connector multi-terminal 603B may also include a plurality of support members 708 and one or more support apertures 810 for connecting multi-terminal 603B to the base plate 400A. There may be N support members 708 and N corresponding apertures 902, where N is any appropriate number.

Figure 9B:
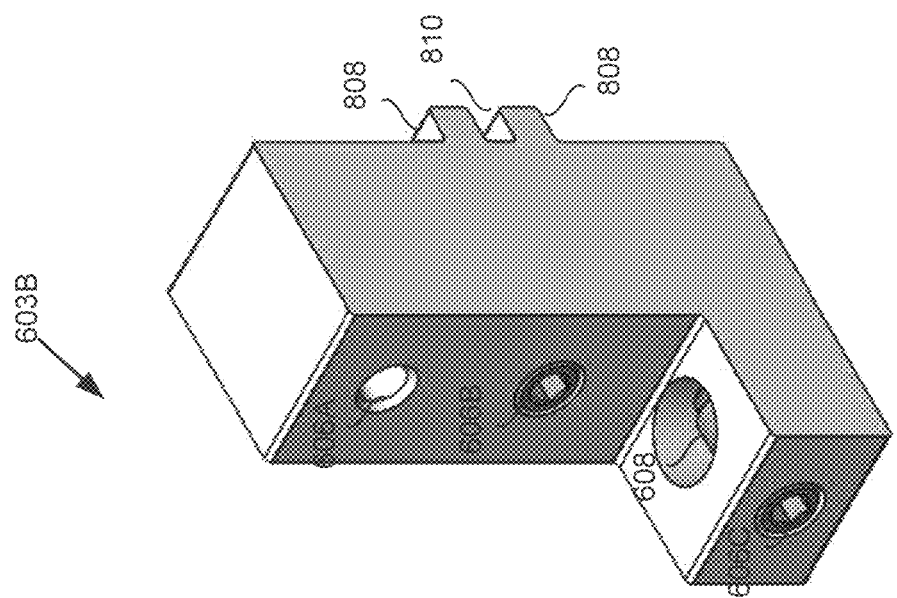
FIG. 9B shows an example front perspective view of a three connector multi-terminal of the base plate.
Figure 9A:
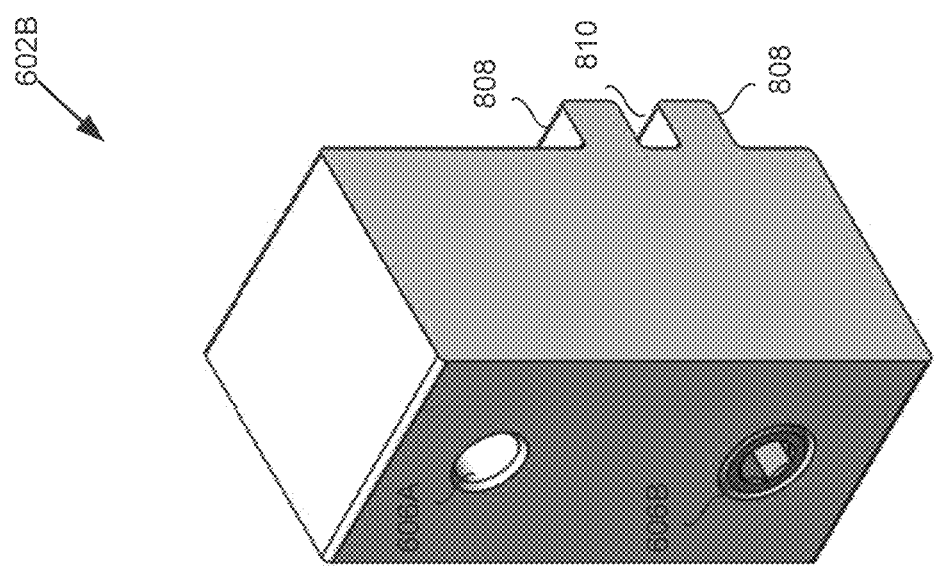
FIG. 9A shows an example front perspective view of a two connector multi-terminal of the base plate.

FIGS. 9A and 9B show examples of multi-terminals 600 according to examples of the present subject matter.

Reference is now made to FIG. 9A, which shows a top perspective view of an example two connector multi-terminal 602B according to examples of the present subject matter. Two connector multi-terminal 602B may include a first terminal connector 606A and a second terminal connector 606B. Two connector multi-terminal 602B may also include a plurality of support members 708 and one or more support apertures 810 for connecting multi-terminal 602B to the base plate 400A.

Reference is now made to FIG. 9B, which shows a top perspective view of an example three connector multi-terminal 603B according to examples of the present subject matter. Three connector multi-terminal 603B may include a first terminal connector 606A, a second terminal connector 606B, and a third terminal connector 606C. Three connector multi-terminal 603B may also include a plurality of support members 708 and one or more support apertures 810 for connecting multi-terminal 603B to the base plate 400.

Four connector multi-terminals 604, or N-connector multi-terminals, may also include one or more support members 708 and one or more support apertures 810 for connecting to the base plate 400A.

FIG. 10 shows an example of a multi-terminal 600 according to examples of the present subject matter.

Reference is now made to FIG. 10, which shows a bottom perspective view of an example three connector multi-terminal 603B according to examples of the present subject matter. Three connector multi-terminal 603B may include a first terminal connector 606A, a second terminal connector 606B, and a third terminal connector 606C. Three connector multi-terminal 603B may also include a plurality of support members 708 and one or more support apertures 810 for connecting multi-terminal 603B to the base plate 400.

The first terminal connector 606A may include an aperture 610A for electromechanically connecting the multi-terminal 603B to one or more other elements of the electrical supply system 100 (e.g., a backup interface module 300A, a different multi-terminal 600, a power source 102, one or more load groups 112, etc.). For example, the one or more other elements of the electrical supply system 100 may be connected to terminal connector 606A with a fastening element 608A to secure the connection between them. The fastening element 608A may be disposed inside aperture 610A. For example, the fastening element 608A may be a screw, bolt, plug, etc. As an example, a conducting (e.g., metallic) busbar may be disposed in physical connection with the multi-terminal 603B and the busbar may be secured to the multi-terminal 603B by connecting the fastening element 608A to the terminal connector 606A (e.g., by threading the screw through an aperture in the busbar and tightening the screw within aperture 610A of the terminal connector 606A). As an example, the busbar may be part of an electromechanical connector 302 of the backup interface module 300A. The busbar may connect to the electrical circuitry of the backup interface module 300A and/or a jumper for connecting the multi-terminal 603B to another multi-terminal 600. By electromechanically connecting the multi-terminal 603B to one or more other elements of the electrical supply system 100 using a relatively good conducting fastening element 608A (e.g., a metallic screw), relatively high currents may be passed with a relatively lower risk of causing a problem (e.g., due to the relatively high currents or a relatively high voltage typically associated with relatively high currents) compared to other fastening elements (such as, fastening elements that include plastic).

The second terminal connector 606B may include a first aperture 610B and a second aperture 612B for connecting the multi-terminal 603B to one or more other elements of the electrical supply system 100. For example, the connecting the multi-terminal 603B to one or more other elements of the electrical supply system 100 may be connected to terminal connector 606B with a fastening element 608B. For example, the fastening element 608B may be disposed inside aperture 610B. For example, the fastening element 608B may be a screw, bolt, plug, etc. For example, the second aperture 612B may be substantially perpendicular to the first aperture 610B. The second aperture 612B may be arranged to facilitate electrical contact between an electrical conductor (such as a jumper) placed in the second aperture 612B and an electricity conducting element of the multi-terminal 603B. For example, the second aperture 612B may be arranged to facilitate the electrical contact between an electrical conductor placed in the second aperture 612B and a fastening element 608A placed in the aperture 610A of the first terminal connector 606A. As an example, a conducting (e.g., metallic) electrical conductor (e.g., jumper) from one or more other elements of the electrical supply system 100 may be disposed in physical connection with the multi-terminal 603B and the electrical conductor (e.g., jumper) may be secured to the multi-terminal 603B by connecting the fastening element 608B to the terminal connector 606B (e.g., by threading the wire through the aperture 612B in the multi-terminal 603B and tightening the screw within aperture 610B of the terminal connector 606B). The electrical conductor (e.g., an end of the wire) may be placed in electrical contact with a fastening element 608A placed in the aperture 610A of the first terminal connector 606A before the fastening element 608B is tightened to secure the electrical conductor to the multi-terminal 603B.

The third terminal connector 606C may include a first aperture 610C, a second aperture 612C, and a third aperture 614C for connecting the multi-terminal 603B to one or more other elements of the electrical supply system 100. For example, the one or more other elements of the electrical supply system 100 may be connected to terminal connector 606C with a fastening element 608C. For example, the fastening element 608C may be disposed inside aperture 610C. For example, the fastening element 608C may be a screw, bolt, plug, etc. For example, the second aperture 612C may be substantially perpendicular to the first aperture 610C. For example, the third aperture 614C may be substantially parallel to the first aperture 610C and substantially perpendicular to the second aperture 612C. The first aperture 610C, second aperture 612C, and third aperture 614C may together form a "T-shaped" aperture of third terminal connector 606C. The second aperture 612C and the third aperture 614C may be arranged to facilitate electrical contact between an electrical conductor (e.g., a wire or cable) placed in the second aperture 612B and an electricity conducting element of the multi-terminal 603B. For example, the third aperture 614C may be arranged to facilitate electrical contact between an electrical conductor placed in the second aperture 612B and another electrical conductor from one or more other elements of the electrical supply system 100 that is placed in the aperture 612B of the second terminal connector 606B. As an example, a conducting (e.g., metallic) electrical conductor (e.g., jumper) from one or more other elements of the electrical supply system 100 may be disposed in physical connection with the multi-terminal 603B and the electrical conductor (e.g., jumper) may be secured to the multi-terminal 603B by connecting the fastening element 608C to the terminal connector 606C (e.g., by threading the wire through the second aperture 612C and the third aperture 614C in the multi-terminal 603B and tightening the screw within aperture 610C of the terminal connector 606C). The electrical conductor (e.g., an end of the wire) may be placed in electrical contact with a different electrical conductor placed in the aperture 612B of the second terminal connector 606B before the fastening element 608C is tightened to secure the electrical conductor placed in terminal connector 606C to the multi-terminal 603B.

A similar arrangement may be provided for four connector multi-terminals 604, or N-connector multi-terminals. The fourth or N terminal connectors may each have a plurality of apertures 610, 612, and 614, which may form a "T-shaped" aperture and a respective fastening elements 608.

FIG. 11 shows an example of a multi-terminal 600 according to examples of the present subject matter.

Reference is now made to FIG. 11, which shows a bottom view of an example three connector multi-terminal 603B according to examples of the present subject matter. Three connector multi-terminal 603B may include a first terminal connector 606A, a second terminal connector 606B, and a third terminal connector 606C. Three connector multi-terminal 603B may also include a plurality of apertures 610, 612, 614, and fastening elements 608.

FIGS. 12A to 14 show an example of a backup interface enclosure 200B.

Figure 12B:
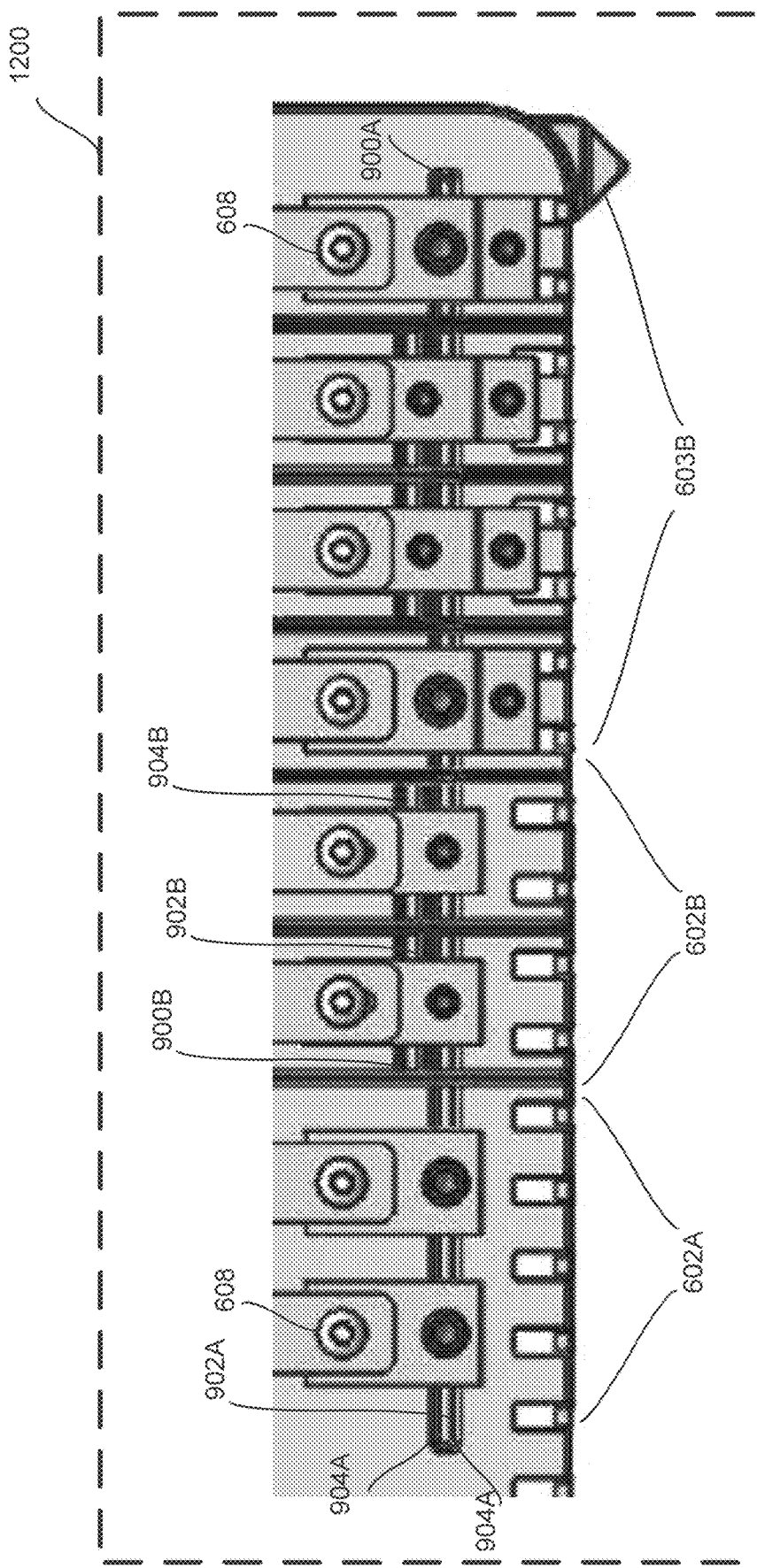
FIG. 12B shows an example of a portion of an interface enclosure.

Reference is now made to FIG. 12A, which shows an example of a backup interface enclosure 200B which may include a backup interface module 300B and a base plate 400B. Backup interface module 300B may contain electronic circuitry (e.g., one or more relays, detection circuits, power devices, transformers, automatic transfer relays, cooling devices, etc.). Backup interface module 300B may be mounted to base plate 400B. Base plate 400B may be mounted inside an electrical mounting 110. Base plate 400B may include a plurality of multi-terminals 600. Each of the multi-terminals 600 may include a plurality of terminal connectors 606 (as may be shown, for example, in FIGS. 6A to 11). The base plate 400B of FIG. 12A may have a plurality of two connector multi-terminals 602 and a plurality of three connector multi-terminals 603. One or more of the multi-terminals 600 may be connected to the backup interface module 300B via electromechanical connectors 302 (as may be shown, for example, in FIG. 3A). A section 1200 of FIG. 12A is shown in greater detail in FIG. 12B.

FIG. 12B shows an example of a section 1200 of a backup interface enclosure 200B.

Reference is now made to FIG. 12B, which shows an example of a section 1200 of a backup interface enclosure 200B. As shown in FIG. 12A and FIG. 12B, base plate 400B may include a plurality of rails 900 that each have an aperture 902 formed by a pair of rail members 904. One or more multi-terminals 600 with a single support member 708 or a plurality of support members 708 (as may be shown as multi-terminals 602B and 603B) may be secured to base plate 400B by connecting the plurality of support members 708 to the plurality of rails 900 by placing each support member 708 into a corresponding aperture 902. In some examples, there may be N support members 708 and N corresponding apertures 902, where N is any appropriate number. Each pair of support members 708 may form a support aperture 810.

In the example of FIG. 12B, base plate 400B may include a first rail 900A that has a first aperture 902A formed by a first pair of rail members 904A and a second rail 900B that has a second aperture 902B formed by a second pair of rail members 904B. One or more multi-terminals 600 with a single support member 708 (as may be shown as multi-terminals 602A) may be secured to base plate 400B by connecting a support member 708 (as may be shown, for example, in FIG. 3A) to the first rail 900A (e.g., placing the support member 708 into the first aperture 902A). One or more multi-terminals 600 with a plurality of support members 708 (shown as multi-terminals 602B, 603B) may be secured to base plate 400B by connecting a first support member 708 to the first rail 900A by placing the first support member 708 into the first aperture 902A and connecting a second support member 708 to the second rail 900B by placing the second support member 708 into the second aperture 902B. For example, when multi-terminals 602B, 603B are connected to the base plate 400A, one or more rail members 904 of the plurality of rails 900 may be placed into support aperture 810. The plurality of support members 708 and the one or more support apertures 810 may provide additional stability to the connection of the multi-terminal 602B, 603B to the base plate 400B. One or more multi-terminals 600 with a single support member 708 may be secured to base plate 400B by connecting a support member 708 to the second rail 900B (e.g., placing the support member 708 into the second aperture 902B).

FIG. 13 shows a top perspective view of the backup interface enclosure 200B.

FIG. 13 shows a perspective view of a backup interface module 300B electromechanically connected to base plate 400B using one or more fastening elements 608. Fastening elements 608 may be arranged to electromechanically connect one or more electromechanical connectors 302 to one or more multi-terminals 600 when the backup interface module 300B is aligned with the base plate 400B. For example, one or more protuberances 308 of the backup interface module 300B may be accepted by one or more curved tracks 500 of the base plate 400B to form a hinged connection between the backup interface module 300B and the base plate 400B. When the one or more protuberances 308 are received at or near the end of the curved track 500, the one or more electromechanical connectors 302 may be aligned with one or more terminal connectors 606 of the one or more multi-terminals 600.

FIG. 14 shows a side view of the backup interface enclosure 200B.

FIG. 14 shows a side view of an electromechanical connector 302 of the backup interface module 300B that may be connected to a corresponding terminal connector 606 of a multi-terminal 600 of the base plate 400B using a fastening element 608. Electromechanical connector 302 of the backup interface module 300B may be aligned with the corresponding terminal connector 606 of the multi-terminal 600 of the base plate 400B due to the arrangement of one or more protuberances 308 of the backup interface module 300B inside one or more corresponding curved tracks 500 of the base plate 400B. For example, placing the one or more protuberances 308 at the end of the corresponding curved tracks 500 may align an aperture of the one or more electromechanical connectors 302 with an aperture of the one or more corresponding terminal connectors 606. The backup interface module 300B may be electromechanically connected to the base plate 400B by securing one or more fastening elements 608 inside the corresponding aligned apertures of the one or more electromechanical connectors 302 and the one or more terminal connectors 606. As an example, a screw, bolt, plug, etc. may be placed inside each of one or more of the corresponding apertures to fasten the backup interface module 300B to the base plate 400B.

Placing the one or more protuberances 308 at the end of the corresponding curved tracks 500 to align the one or more electromechanical connectors 302 with the one or more corresponding terminal connectors 606 may also result in the back cover 306 of the backup interface module 300B to rest against a front surface of the base plate 400B. For example, one or more heat dispersing elements 304 of the back cover 306 may be placed in contact with the surface of the base plate 400B. Back cover 306 may be arranged to house and protect elements (e.g., circuitry) located inside the backup interface module 300B.

Figure 15:
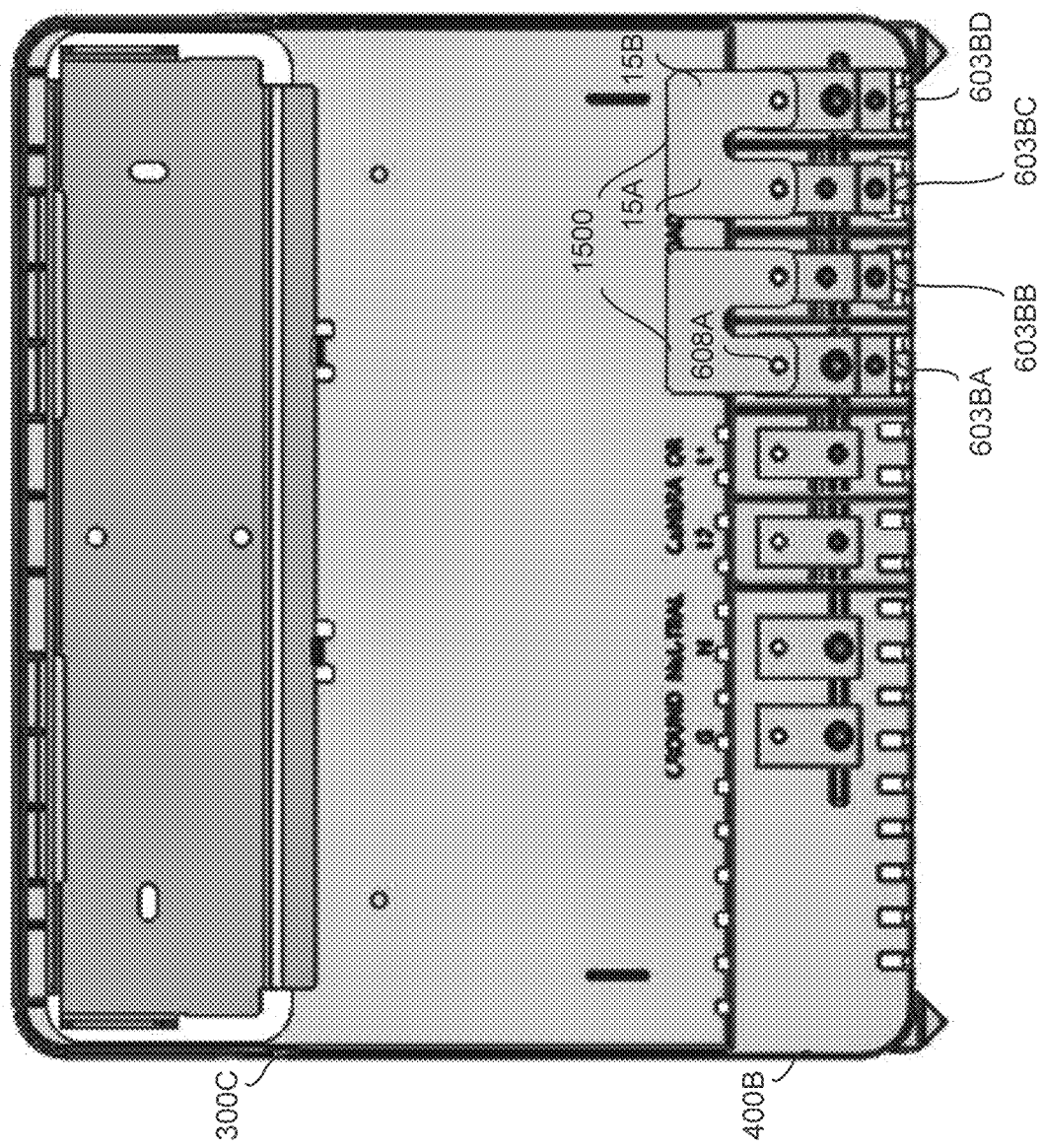
FIG. 15 shows an example view of an interface enclosure with the front cover of the backup interface module removed.
Figure 16:
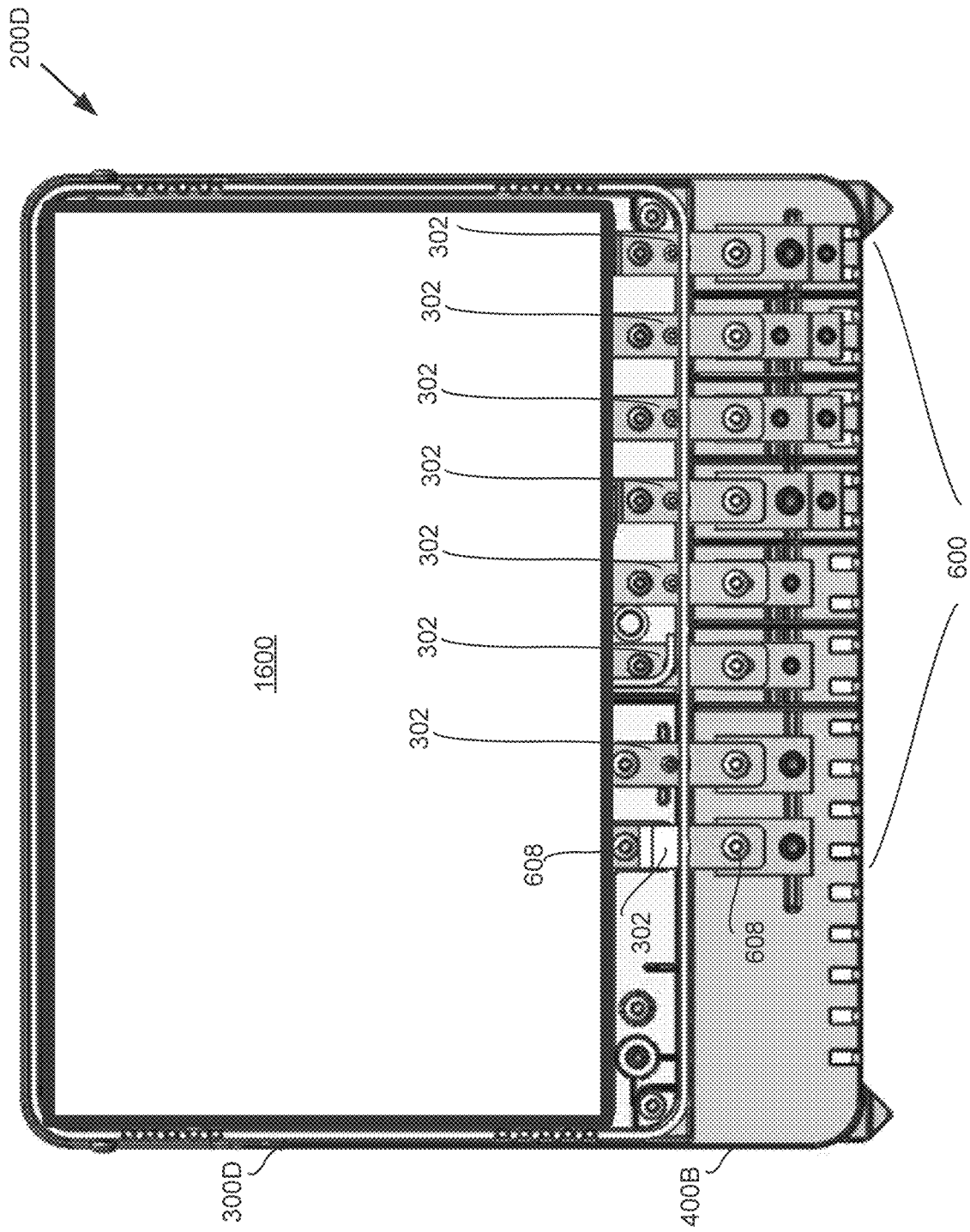
FIG. 16 shows an example front view of a different interface enclosure with the front cover of the backup interface module removed.

FIGS. 15 and 16 show examples of backup interface enclosures 200C and 200D with their front cover 305 removed.

Reference is now made to FIG. 15, which shows an example of a backup interface enclosure 200C with the front cover 305 of the backup interface module 300C removed. Backup interface module 300C may include one or more jumpers 1500 housed inside the walls of the housing of the backup interface module 300C. Each jumper 1500 may include a first leg 15A and a second leg 15B. The legs 15A and 15B of the jumpers may be the electromechanical connectors 302 (e.g., lugs) of the backup interface module 300C used to connect the backup interface module 300C to the multi-terminals 600 of the base plate 400B. Each leg 15A or 15B may include an aperture for connecting the jumper 1500 to a plurality of multi-terminals 600. For example, a first jumper 1500 may be connected to multi-terminal 603BA and multi-terminal 603BB. A second jumper 1500 may be connected to multi-terminal 603BC and multi-terminal 603BD. For example, the jumper 1500 may be connected to each terminal connector 606A with a fastening element 608A. As an example, the jumper 1500 may be a conducting (e.g., metallic) busbar with a first leg 15A and a second leg 15B, with each having a respective aperture for connecting to a corresponding multi-terminal 600. The first leg 15A of the busbar may be disposed in physical contact with the first multi-terminal 603BA and the second leg 15B of the busbar may be disposed in physical contact with the second multi-terminal 603BB. The busbar may be secured to the first multi-terminal 603BA by connecting a first fastening element 608A to the first terminal connector 606A of the first multi-terminal 603BA and a second fastening element 608A to the first terminal connector 606A of second multi-terminal 603BB (e.g., by threading the first screw 608A through the aperture in the first leg 15A and tightening the first screw 608A within aperture 610A of the terminal connector 606A of the first multi-terminal 603BA, and threading the second screw 608A through the aperture in the second leg 15B and tightening the screw 608A within aperture 610A of the terminal connector 606A of second multi-terminal 603BB). By electromechanically connecting the backup interface module 300C to the multi-terminals 600 of the base plate 400B using a relatively good conducting fastening element 608A (such as, a metallic screw), relatively high currents may be passed with a relatively lower risk of causing a problem (e.g., due to the relatively high currents or a relatively high voltage typically associated with relatively high currents) compared to other fastening elements (such as, fastening elements that include plastic).

Reference is now made to FIG. 16, which shows an example of a backup interface enclosure 200D with the front cover 305 of the backup interface module 300D removed. Backup interface module 300D may include electronic circuitry 1600 housed inside the walls of the housing of the backup interface module 300D. Electronic circuitry 1600 may include: one or more relays, detection circuits, power devices, transformers, automatic transfer relays, cooling devices, etc. Electronic circuitry 1600 may be connected to multi-terminals 600 using electromechanical connectors 302. For example, each of the electromechanical connectors 302 may be connected to a terminal connector 606A with a fastening element 608A. As an example, each electromechanical connector 302 may be a conducting (e.g., metallic) busbar having at least one aperture for connecting to a respective multi-terminal 600 of the base plate 400B. The electromechanical connector 302 may be a busbar that connects to the electronic circuitry 1600 housed inside the walls of the housing of the backup interface module 300C. Each busbar may be disposed in physical contact with a respective multi-terminal 600 and each busbar may be secured to the respective multi-terminal 600 by connecting a fastening element 608A to the terminal connector 606A (e.g., by threading the screw through the aperture 610A and tightening the screw within aperture 610A of the terminal connector 606A). By electromechanically connecting the backup interface module 300D to the multi-terminals 600 of the base plate 400B using a relatively good conducting fastening element 608A (such as, a metallic screw), relatively high currents may be passed with a relatively lower risk of causing a problem (e.g., due to the relatively high currents or a relatively high voltage typically associated with relatively high currents) compared to other fastening elements (such as, fastening elements that include plastic).

Each electromechanical connector 302 may include an additional aperture and fastening element 608 on the other side of metallic busbar housed inside the backup interface module 300D to connect the electromechanical connector 302 to electronic circuitry 1600. This arrangement may connect the backup interface module 300D to one or more other elements of the electrical supply system 100 via the multi-terminals 600 of the base plate 400B.

Different backup interface modules 300 may allow for modularity. For example, depending on whether full backup, partial backup, or no backup is to be arranged, different backup interface modules 300 may be connected to the base plate 400A and/or base plate 400B. For example, if no backup is to be arranged, then backup interface module 300C may be connected to base plate 400B. If full backup or partial backup is to be arranged, then backup interface module 300D may be connected to base plate 400B. The different backup interface modules 300 may be connected for different situations. After one type of backup interface module 300 has been connected, it may be replaced by a different backup interface module 300. For example, if at first no backup is arranged, but then full backup or partial backup is to be arranged, then backup interface module 300C may be switched with backup interface module 300D.

In residential applications, photovoltaic (PV) systems are available to provide limited auxiliary power, which may be, in some cases, less power than a utility grid. In some cases, a battery or other energy storage device might provide limited backup power and energy. Thus, it may be advantageous to provide means for allocating the reduced power to only the critical loads during a backup mode of operation. The installation of typical residential PV systems may be enhanced by a separate back-up panel for the critical loads, so that critical loads are connected to the separate back-up panel when the backup power source is providing power to the back-up panel.

Figure 17A:
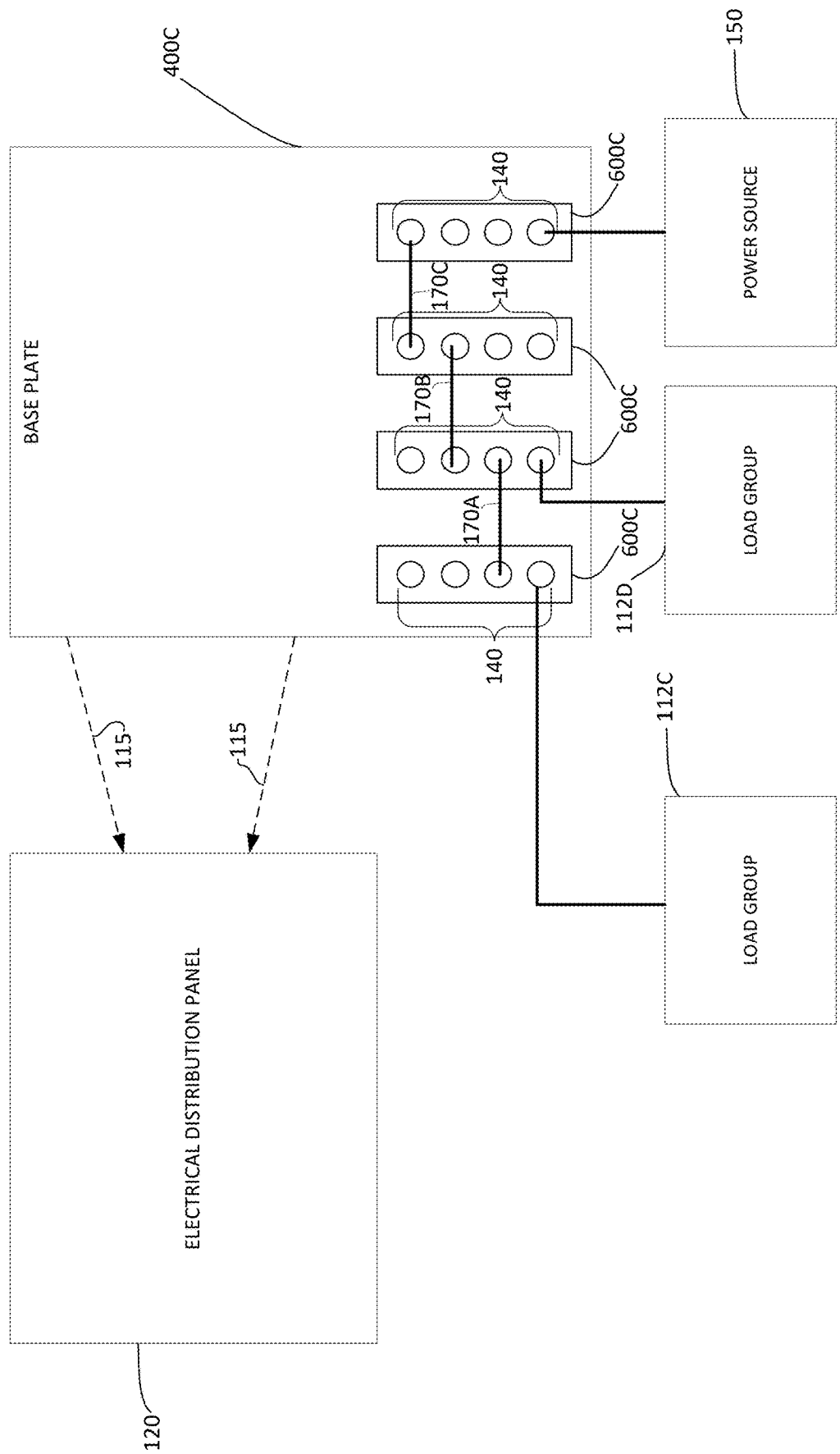
FIG. 17A shows an example wiring configuration of a backup system.

Reference is now made to FIG. 17A. A backup system comprises a base plate 400C (e.g., base plate 400A, base plate 400B). In FIG. 17A, dotted arrows 115 are intended to indicate a mechanical connection. Due to the limits of depiction in the figures, a depiction of the actual connection is not provided. The base plate 400C may comprise a plurality (e.g., as shown in FIG. 17A, three) multi-terminals 600C (e.g., multi-terminals 600, multi-terminals 600A, multi-terminals 600B). Each multi-terminal 600C of the multi-terminals 600C may comprise a plurality of terminal connections 140 (e.g., using one or more terminal connectors 606). Each terminal connection 140 of the plurality of terminal connections 140 may be mechanically and electrically configured to connect to a terminal of a power source (e.g., a primary power source 150), a load group 112, or a second of the multi-terminals 600C. Each multi-terminal 600C of the plurality of multi-terminals 600C may include two or more sets of terminal connections 140—for example, positive and negative connections in case of direct current power, or Line-1 and Line-2 (and, in some cases, Line-3 for three-phase power, and/or a neutral line connection) connections in case of alternating current power.

A first load group 112C may be electrically connected to one of the terminal connections 140 in a first one of the multi-terminals 600C. A second load group 112D may be electrically connected to one of the terminal connections 140 in a second one of the multi-terminals 600C. According to some features, the base plate 400C may be configured to be mounted next to or as part of an electrical distribution panel 120, such as a mounting 110 of FIG. 1, and may share a common enclosure with electrical distribution panel 120 (e.g., electrical distribution panel 120 and base plate 400C may be disposed in a common electrical cabinet). For example, first and second load groups 112C and 112D may be connected (e.g., via circuit breakers) to electrical distribution panel 120. The electrical distribution panel 120 may include circuit breakers and/or other circuitry configured to connect to electrical loads. Individual loads of first load group 112C may be connected to multi-terminals 600C via electrical distribution panel 120, and individual loads of second load group 112D may be connected to multi-terminals 600C via another electrical distribution panel. For simplicity, figures in the disclosure herein depict a direct connection between load groups 112C and 112D and multi-terminals 600C, but it is to be understood that a physical connection between loads of a load group and multi-terminals 600C may include a physical connection via an electrical distribution panel.

A first jumper 170A may provide an electrical connection between a first one of the multi-terminals 600C and a second one of the multi-terminals 600C. A second jumper 170B may connect the second one of the multi-terminals 600C and a third one of the multi-terminals 600C. A third jumper 170C may connect the third one of the multi-terminals 600C and a fourth one of the multi-terminals 600C. The fourth one of the multi-terminals 600C may be connected to the power source 150. The power source 150 may be a main electrical grid and may provide an AC electricity output to the first load group 112C and the second load group 112D, via the multi-terminals 600C and the jumpers 170A, 170B, 170C.

Jumpers 170A, 170B, and/or 170C (as well as other jumpers described herein) may each comprise a length of an electrical conductor (e.g., aluminum or copper) used to close, open or bypass part of an electronic circuit. It is appreciated that the terms "closed" or "on" may be used interchangeably to refer to a configuration where the jumper is physically connected between two terminal connections 140 disposed in different or the same multi-terminal 600C.

The above discussion is by way of example and not meant to be limiting. For example, there may be three, five, or even ten of the multi-terminals 600C. The multi-terminals 600C are depicted as having four-terminal connections 140, however, any number of terminals is possible. Further, each multi-terminal 600C may have one or more instances or pairs (e.g., for positive and negative connections, or multi-line or multi-phase connections, and/or to provide a neutral line).

The mechanical connection indicated by the dotted arrows 115 in FIG. 17A may, for example, comprise a hanging track (not depicted), into which a protuberance, tab, rod, dowel, or other matching mechanical connectors of the backup interface module 120A may be inserted.

The combination of the multi-terminals (such as 600 and similar references) on the base plate (such as base plate 400 and similar references), a hinged backup interface (such as 200, 300, or similar references) containing relays (such as 210, 310, 510 and similar references), and jumpers (e.g., jumpers 1500, 170A, 170B, 170C, 270A, 270B, 370A, 370B, and 570B) allows configuring the electrical partial or full house electrical backup according to the end-user requirements or needs. When the end-user wishes to reconfigure the partial or full house electrical backup, the reconfiguration and/or changes may be implemented with little disruption and downtime to the electrical system of the residence. For example, switching from a partial to a full house backup can be configured by replacing the hinged backup interface and jumpers on the multi-terminals. For example, changing loads in a partial house backup from a critical load group to a non-critical load group can be configured by switching a jumper on the multi-terminals. For example, changing a partial house backup from two load groups to three load groups, such as connecting one load group to solar power when available, connecting another load group to a battery backup, and a third (non-critical) load group to the utility grid, may be configured by replacing the hinged backup interface, reconfiguring the jumpers, and/or switching the load between the groups. Using the multi-terminals, base plate, hinged backup interface containing relays, and the jumpers solves the problem of configuring a partial or full house backup to residential or other types of power generation and storage capabilities, and enables efficient reconfiguration of the different load groups to meet the end-user usage needs and residential capabilities when the capabilities are updated.

Figure 17B:
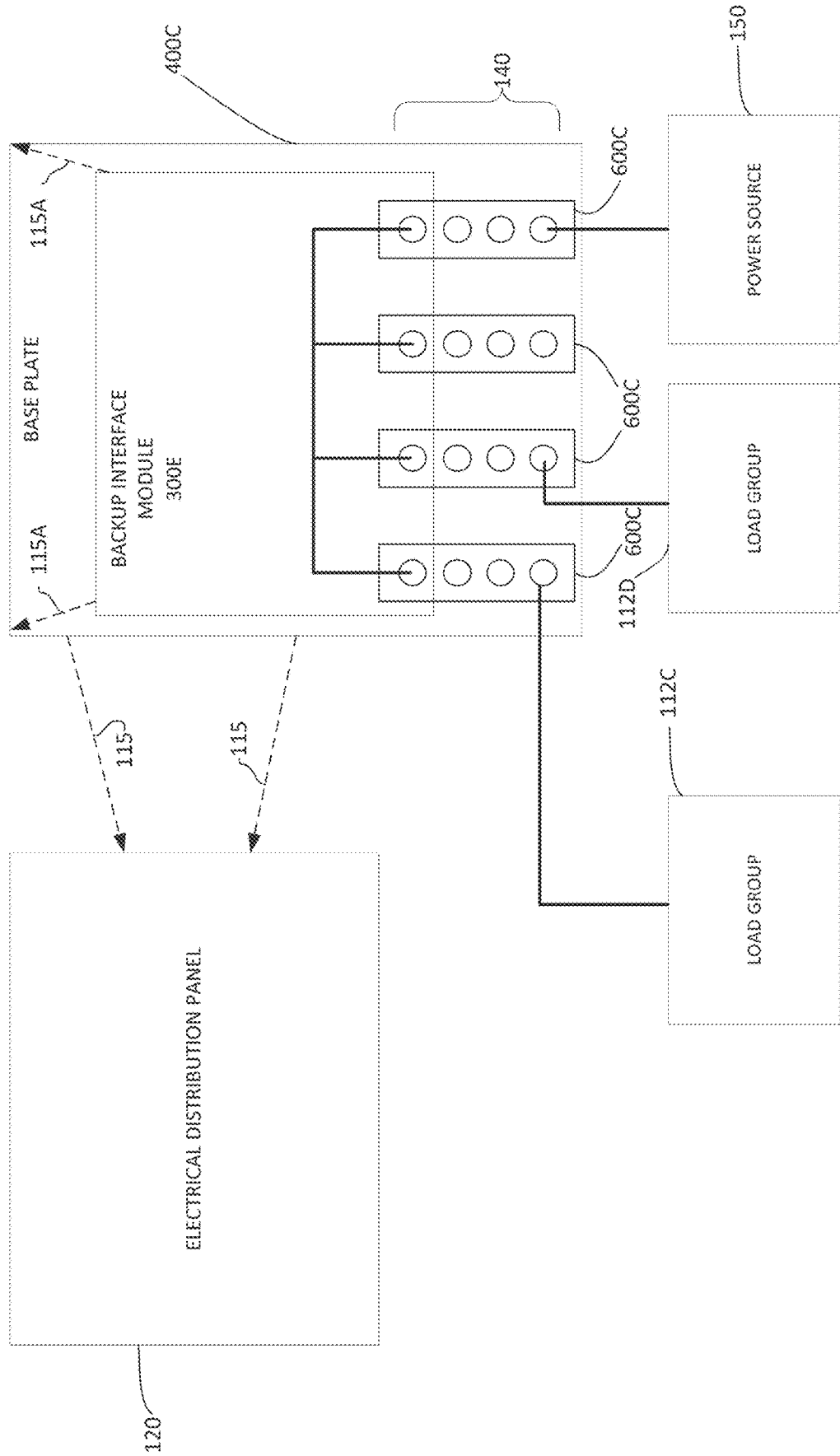
FIG. 17B shows an example wiring configuration of a backup system including a backup interface module.

Reference is now made to FIG. 17B, which shows a backup interface module 300E disposed in the base plate 400C. Backup interface module 300E may be a cover, and may comprise jumpers configured to connect multi-terminals 600C to one another, instead of using jumpers 170A-170C depicted in FIG. 17A. Providing backup interface module 300E may simplify and reduce installation-time, by enabling quick and easy interconnection of multi-terminals. Backup interface module 300E may be designed in a modular manner, such that it may be of a similar or identical mechanical design as a backup interface module, and may be removed and replaced with a backup interface module including active circuitry, if backup capability is to be added to the system.

Figure 18A:
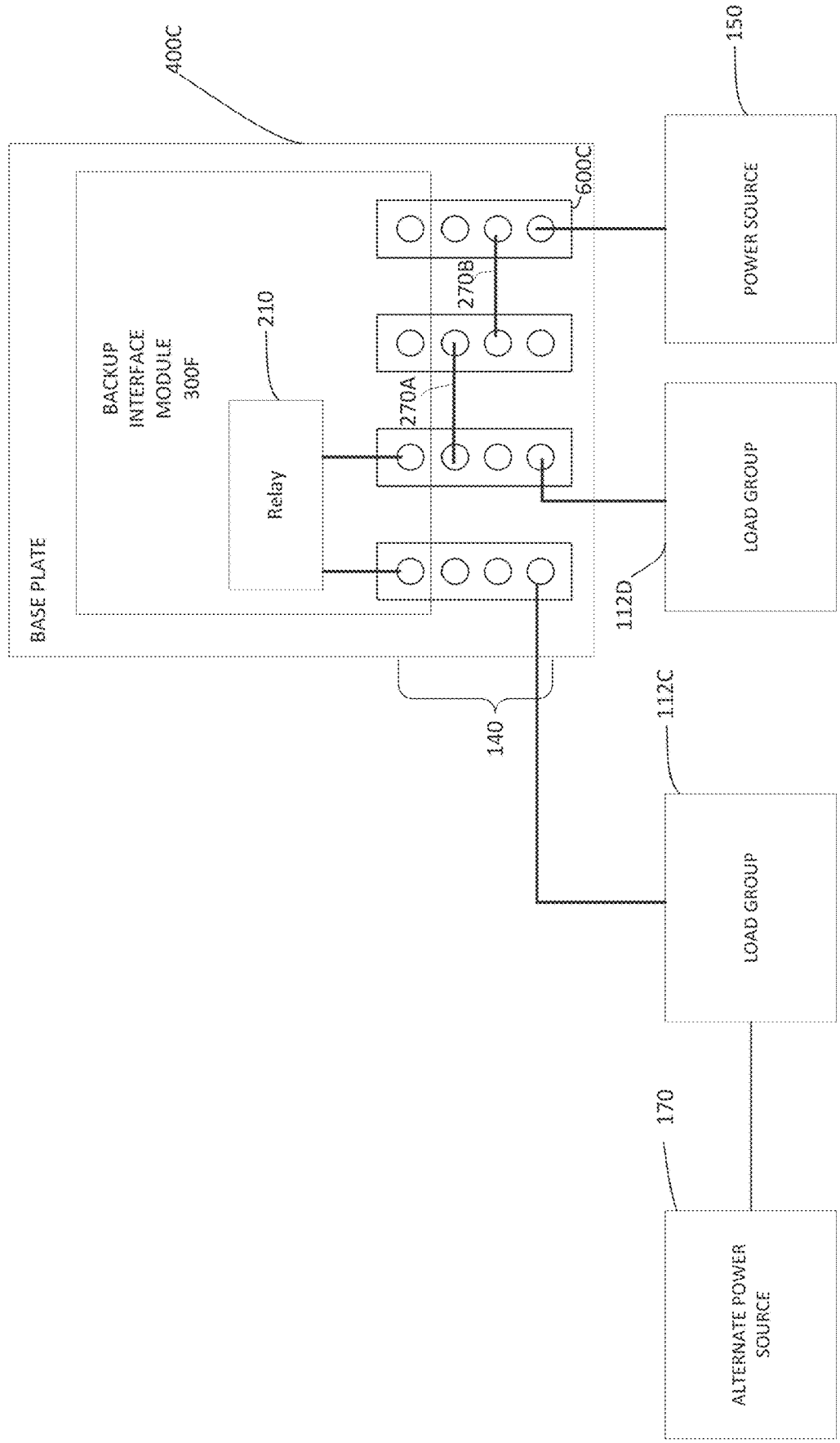
FIG. 18A shows an example wiring configuration of a backup system including a backup interface module.

Reference is now made to FIG. 18A, which shows an example wiring configuration of the backup system. A backup interface module 300F may be configured to be connected to (e.g., disposed in or placed on) the base plate 400C. The backup interface module 300F may comprise active circuitry which is connected to multi-terminals 600C when the backup interface module 300E is connected to base plate 400C. By way of example, a relay 210 may be comprised in the backup interface module 300E. The relay 210 may comprise, for example, an electromechanical relay, a solid state relay (e.g., MOSFETs, IGBTs, other transistors).

The relay 210 may comprise a switching mechanism connected (when the backup interface module is placed on the base plate) between two or more of the multi-terminals 600C. A first load group 112C may be connected (e.g., electrically connected) to a first one of the multi-terminals 600C. The first load group 112C may be connected to an alternative power source 170, such as a photovoltaic inverter, which may convert power from photovoltaic modules (e.g., panels or shingles) to AC power. Alternative power source 170 may also be referred to as "alternate power source" or "backup power source". A second load group 112D may be connected (e.g., electrically connected) to a second one of the multi-terminals 600C, which may, in turn, be connected via jumpers 270A and 270B to power source 150, which may be a primary power source, such as a local utility electrical grid. The relay 210 may be normally closed, such that alternative power source 170, load groups 112C and 112D and power source 150 are all interconnected. Relay 210 may be opened (e.g., turned off) in the event of an outage (e.g., a power failure) of the power source 150. In such a case, the first load group 112C may not be powered by power source 150. Rather, first load group 112C may be powered by alternative power source 170, while galvanic isolation between alternative power source 170 and power source 150 may be provided by relay 210 being open. Galvanic isolation between alternative power source 170 and power source 150 may allow technicians to operate for the resumption of power from power source 150 without danger of being electrocuted by power produced by alternative power source 170.

The first one of the multi-terminals 600C and the second one of the multi-terminals 600C may be connected by the relay 210, which may comprise a power relay. The relay 210 may, for example, comprise an electromechanical relay or (where this may be permitted by local regulations) a solid-state relay (e.g., MOSFETs, IGBTs, or other transistors).

In the configuration of FIG. 18A, the alternative power source 170 may provide backup power to the first load group 112C when the relay 210 is open.

Figure 18B:
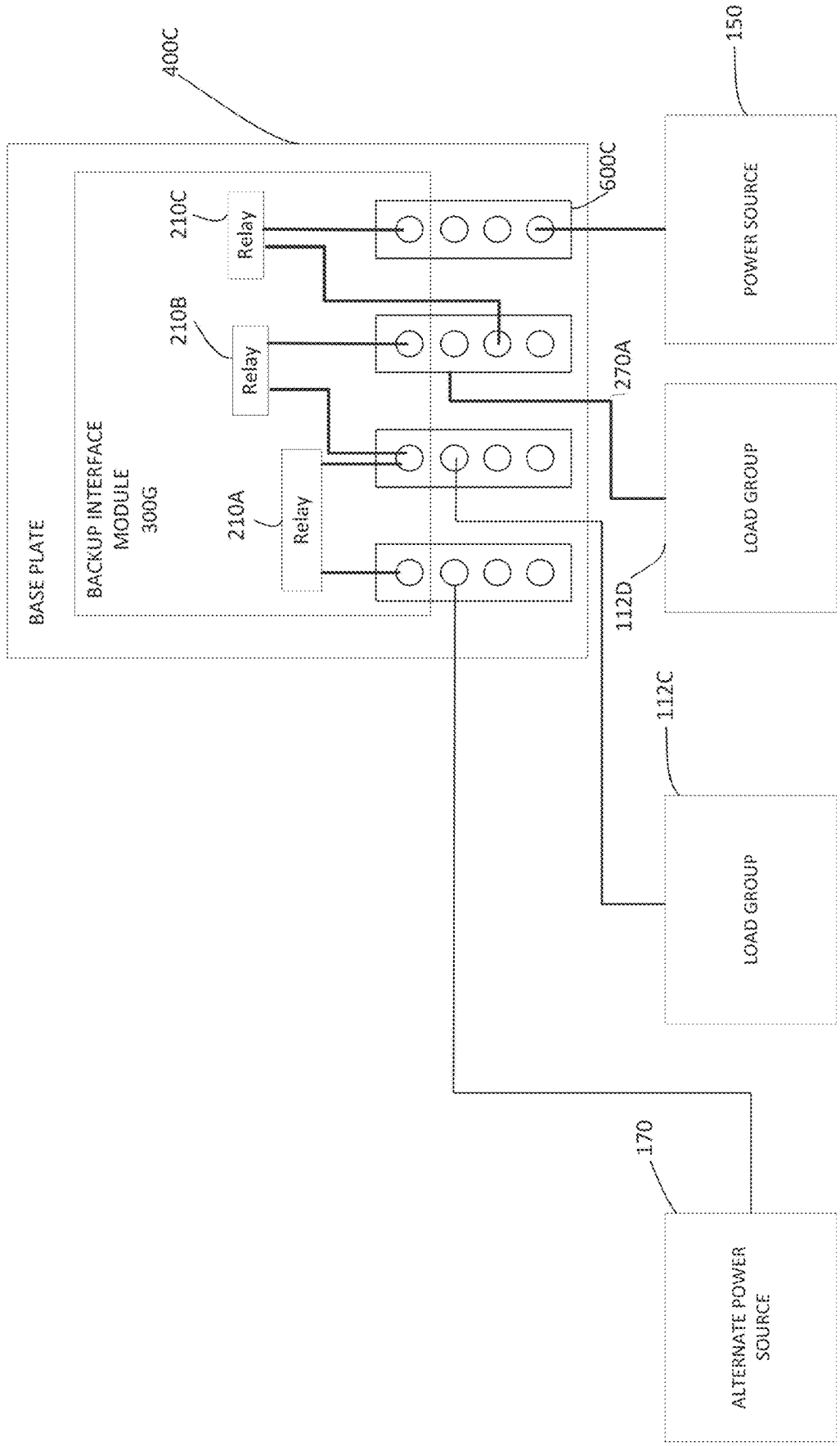
FIG. 18B shows an example wiring configuration of a backup system including a backup interface module.

Reference is now made to FIG. 18B, which shows an example wiring configuration of the backup system. In the example wiring configuration of FIG. 18B, a first multi-terminal 600C is connected to power source 150 (e.g., an electrical grid), a second multi-terminal 600C is connected to first load group 112C, a third multi-terminal 600C is connected to second load group 112D, and a fourth multi-terminal 600C is connected to alternative power source 170. Backup interface module 300F comprises a first relay 210A connected between the fourth and third multi-terminals, a second relay 210B connected between the third and second multi-terminals, and a third relay 210C connected between the second and first multi-terminals. When all three relays are closed (e.g., turned on), all four multi-terminals may be interconnected. Such as when power source 150 is not able to provide power (e.g., due to grid outage), relay 210C may be opened, which may isolate power source 150 (e.g., for the safety of personnel that may access power source 150). According to a first backup configuration, relays 210B and 210A may be closed (e.g., turned on), connecting loads groups 112C and 112D to alternative power source 170. According to a second backup configuration, relay 210A may be closed (e.g., turned on), connecting loads groups 112C to alternative power source 170, while relay 210B is open (e.g., turned off), disconnecting load group 112D from alternative power source 170. The second configuration may be preferable when alternative power source 170 does not produce enough power to power both loads groups 112C and 112D, and load group 112C may comprise critical loads.

A controller (not explicitly depicted, but connected to the circuitry of backup interface module 300F) may be configured to always select either the first or second backup configurations in case of a backup condition, or may selectively choose either the first or second backup configuration based on current power production capabilities of alternative power source 170, power drawn by loads groups 112C and 112D, and/or the like. The selective choosing may be based on sensor(s) measurements, and or communication signals received by the controller.

Figure 19A:
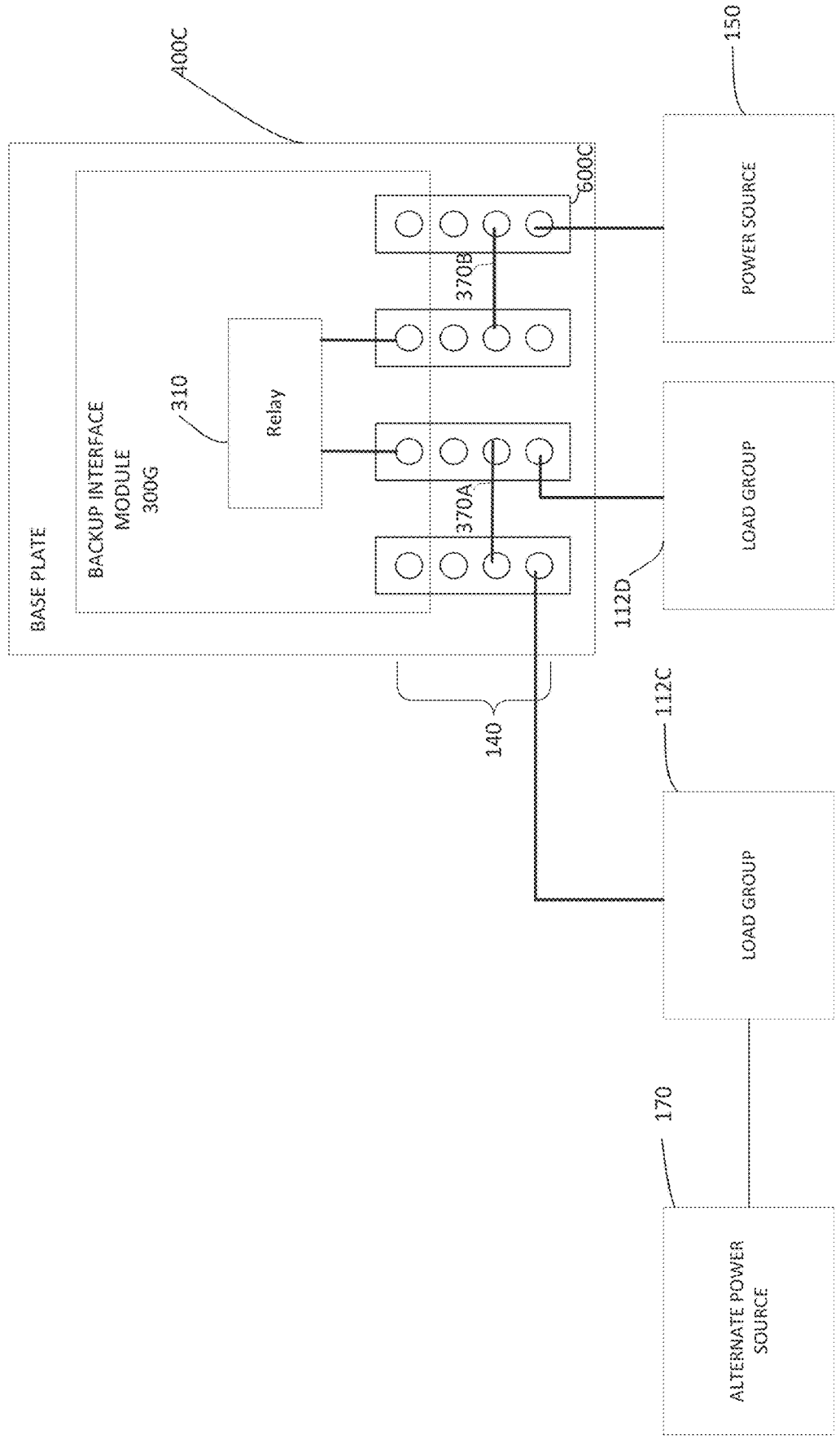
FIG. 19A shows an example wiring configuration of a backup system including a backup interface module.

Reference is now made to FIG. 19A, which shows an example wiring configuration of the backup system. Relay 310 of backup interface module 300G may, when closed, connect between the second one of the multi-terminals 600C and the third one of the multi-terminals 600C. The first one of the multi-terminals 600C and the second one of the multi-terminals 600C may be connected by first jumper 370A. The third one of the multi-terminals 600C and the fourth one of the multi-terminals 600C may be connected by second jumper 370B.

In the event of a failure of the alternative power source 150, backup power may be provided by alternative power source 170 to the first load group 112C and the second load group 112D via first jumper 370A. In such a case, the relay 310 may be open (e.g., turned off). The configuration of FIG. 19A may provide reduced flexibility compared to the configuration of FIG. 18B, but may provide a reduced component count and simpler control.

Figure 19B:
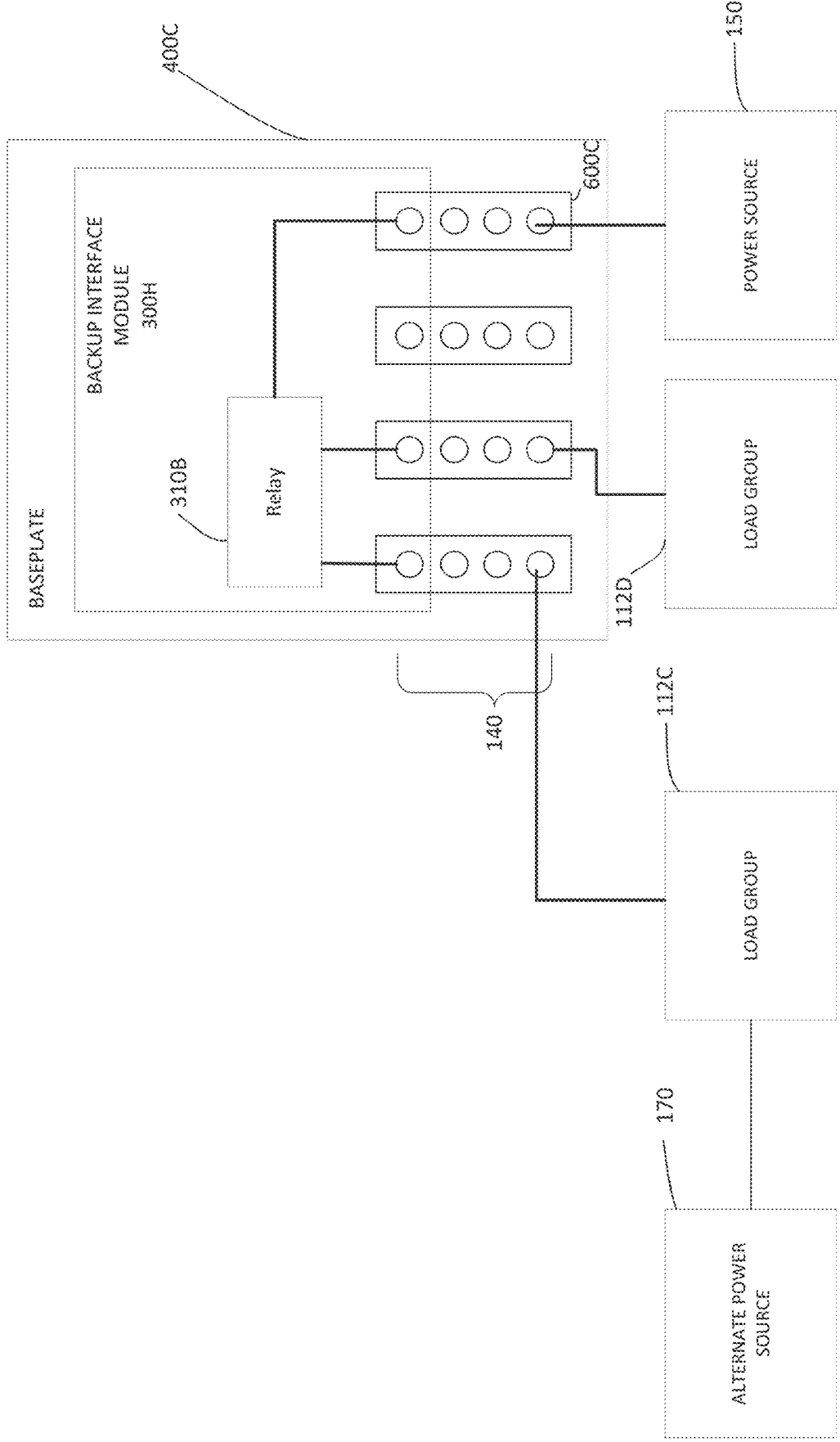
FIG. 19B shows an example wiring configuration of a backup system including a backup interface module.

Reference is now made to FIG. 19B, which shows an example wiring configuration of the backup system. In the configuration of FIG. 19B, relay 310B of backup interface module 300H may comprise a multiple switching circuit relay (similar to or the same as two or more of the three relays shown in FIG. 18B). In the configuration of FIG. 19B, Relay 310B may connect the first of the multi-terminals 600C, to which the power source 150 is electrically connected, to the third and fourth ones of the multi-terminals 600C. Accordingly, power may be provided to the second load group 112D from the power source 150 via two closed switches of Relay 310B, creating an electrical connection between the power source 150 and the second load group 112D over the first and third of the multi-terminals 600C. In the event of a failure of power source 150, a third switch of the Relay 310B may close, electrically connecting load group 112D to alternative power source 170.

Relay 310B may comprise an automatic transfer switch (ATS). The ATS may include interlock functionality. For example, Relay 310B may include switching circuitry and a controller configured to selectively connect a multi-terminal connected to load group 112D to either a multi-terminal connected to alternative power source 170, or to a multi-terminal connected to power source 150, but never both at once. The interlock functionality may be electrical. For example, such as by providing a first signal to a first relay contact connecting load group 112D to a multi-terminal connected to alternative power source 170, and a second signal that is an inversion of the first signal to a second relay contact connecting load group 112D to a multi-terminal connected to power source 150. In this manner, a connection between alternative power source 170 and power source 150 may be made or broken by operating a third relay contact independently of the first and second relay contacts. This may help reduce the chance of an accidental connection between alternative power source 170 and power source 150 via the load group multi-terminals.

Figure 20:
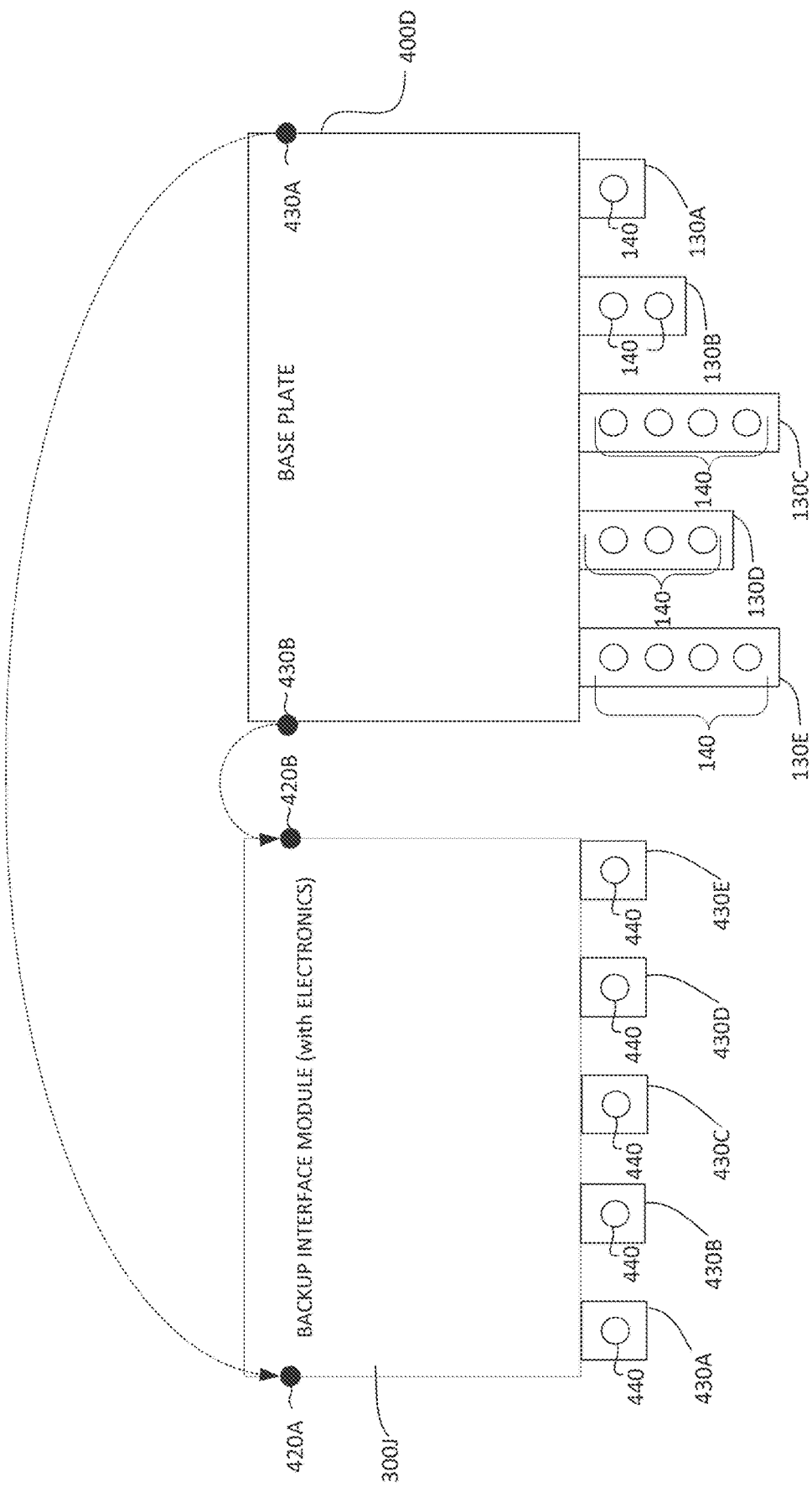
FIG. 20 shows an example connection between a base plate and a backup interface module.

Reference is now made to FIG. 20, which shows an example connection between a base plate 400D and a backup interface module having electronics 300J. The base plate 400D may be the same as or similar to the base plate 400C of FIG. 17, or other base plates 400 shown and described herein. The base plate 400D may be affixed to the backup interface module with electronics 300J. The base plate 400D may comprise two connection points 430A and 430B. The backup interface module with electronics 300J may comprise two connection points 420A and 420B. When the backup interface module with electronics 300J is inverted (as indicated by the dotted arrows), the connection point 420A of module 300J is substantially aligned with the connection point 430A of base plate 400D, and the connection point 420B of module 300J is substantially aligned with the connection point 430B of base plate 400D. When the connection points 420A and 420B are aligned with the connection point 430A and 430B (respectively), the mechanical connection indicated by the dotted arrows 115A in FIG. 17B may then be formed by inserting the connection point 430A into backup interface module with the connection point 420A and the connection point 430B into the connection point 420B.

Connection points 420A-430A and 420B-430B may form, for example, a hinged attachment. The hinged attachment may be a fixed hinged attachment, or may be a removable hinge. Appropriate hinge attachment mechanisms may be used to provide the connection at connection points 420A-430A and 420B-430B. For example, the hinge may include one or more protuberances of the backup interface module and one or more curved tracks of the base plate.

The backup interface module with electronics 300J may comprise various connection elements 430A, 430B, 430C, 430D, and 430E, (by way of a non-limiting example, five such elements are depicted, but any number are possible). The number of such connection elements 430A, 430B, 430C, 430D, and 430E may vary as needed, depending on a given implementation. Connection elements 430A, 430B, 430C, 430D, and 430E may comprise protrusions, screws, rivets, bolts, or other fastener elements. These may allow for connections 440 to mate with corresponding terminal connections 140. When the backup interface module with electronics 420 is attached to the base plate, the connection elements 430A, 430B, 430C, 430D, and 430E may align with and penetrate into a corresponding one of the plurality of terminal connections 140 comprised in the multi-terminals 600C. In such a fashion, the electronics in the backup interface module with electronics 420 may be connected. The various connection elements 430A, 430B, 430C, 430D, and 430E may include one or more electromechanical connectors 302 and/or one or more fastening elements 608.

Selectively connecting or disconnecting any one load group of the plurality of load groups 112C, 112D, etc. may be commanded by a controller. For example, operations may be controlled based on a sensor reading indicating a failure of the power source 150, or based on a communication received by a communication device coupled to the controller. The controller may comprise an appropriate computing device comprising one or more microprocessors, microcontrollers, analog control circuits, or other appropriate computing devices.

The controller may provide an execution platform for executing machine readable instructions such as software. One of the one or more microprocessors, microcontrollers may be a special purpose processor operative for executing the operations of the controller as described herein.

The controller may, by controlling the at least one power relay and other switches which may be present in the device backup interface module 300, selectively provide backup power to one or more load groups 112.

For example, if a first load group comprises a heating unit, a second load group comprises a television, and a third load group comprises a refrigerator, the apparatus described herein may be configured to provide electrical power to the refrigerator under all circumstances, while the heating unit may be selectively powered, depending on seasonal concerns (e.g., time of year). Additionally or alternatively, the apparatus may be configured to not provide power to the television, for example, during a power outage.

Additionally or alternatively, the apparatus may be configured to provide power to the refrigerator and the heating unit under all circumstances, while only providing power to the television if enough power may be provided to the refrigerator and the heating unit for a minimum of a period of time (e.g., 4 hours).

It is appreciated that such configuration may be performed manually by physically connecting the load group(s) with jumpers, as may be described above for example with reference to FIGS. 17A and 19A. Alternatively, by using switching mechanisms (e.g., the relays 210, 210A-C, 310, 310B), which may be controlled by the controller, the load center may have its electrical power needs supplied via the second section and at a later stage, via the first section.

The alternative power source 170 may, by way of example, comprise a photovoltaic inverter that is attached to a photovoltaic (PV) system. The inverter may convert DC electricity provided by a plurality of PV panels into AC electricity, which is then provided to an AC electric grid, which may, by way of example, be the community electric power grid. The PV system may also provide DC power to a battery, which may also be connected to one of the plurality of terminal connections 140. Accordingly, in the event of a failure of the local electric power grid, the battery may serve as an additional source of electrical power. In some cases, a battery may be coupled to a second inverter having an AC output connected to the AC output of the photovoltaic inverter. Various load groups 112 may be assigned priorities which the controller uses to determine which of the various load centers is to be provided electrical power at the expense of which other of the various load centers. For example, if the heating unit, the refrigerator, and the television comprise the various load groups 112, the controller may be programmed and/or configured to provide electrical power to the heating unit and the refrigerator at the cost of removing electrical power from the television. If the local electrical grid does not return to provide power, the heating unit may be maintained at the cost of removing electrical power from the refrigerator.

In the event of a power failure, a local power source, such as a local electrical power grid, will no longer provide electrical power. The power source, or any additional source of electrical power (for example, a battery), may provide or continue to provide electrical power. If the inverter receives DC electricity from a PV system, as shade increases, or as night falls, a quantity of electricity produced by the PV system may decline or a quantity of stored electricity in the battery may decline. Accordingly, the various load centers, as described above, may be disconnected according to priorities, such as described immediately above. Similarly, as power begins to return to the inverter at daybreak, one of the various load groups 112 may be prioritized for receiving electrical power, while a second one of the load groups 112 may remain without power.

Figure 21:
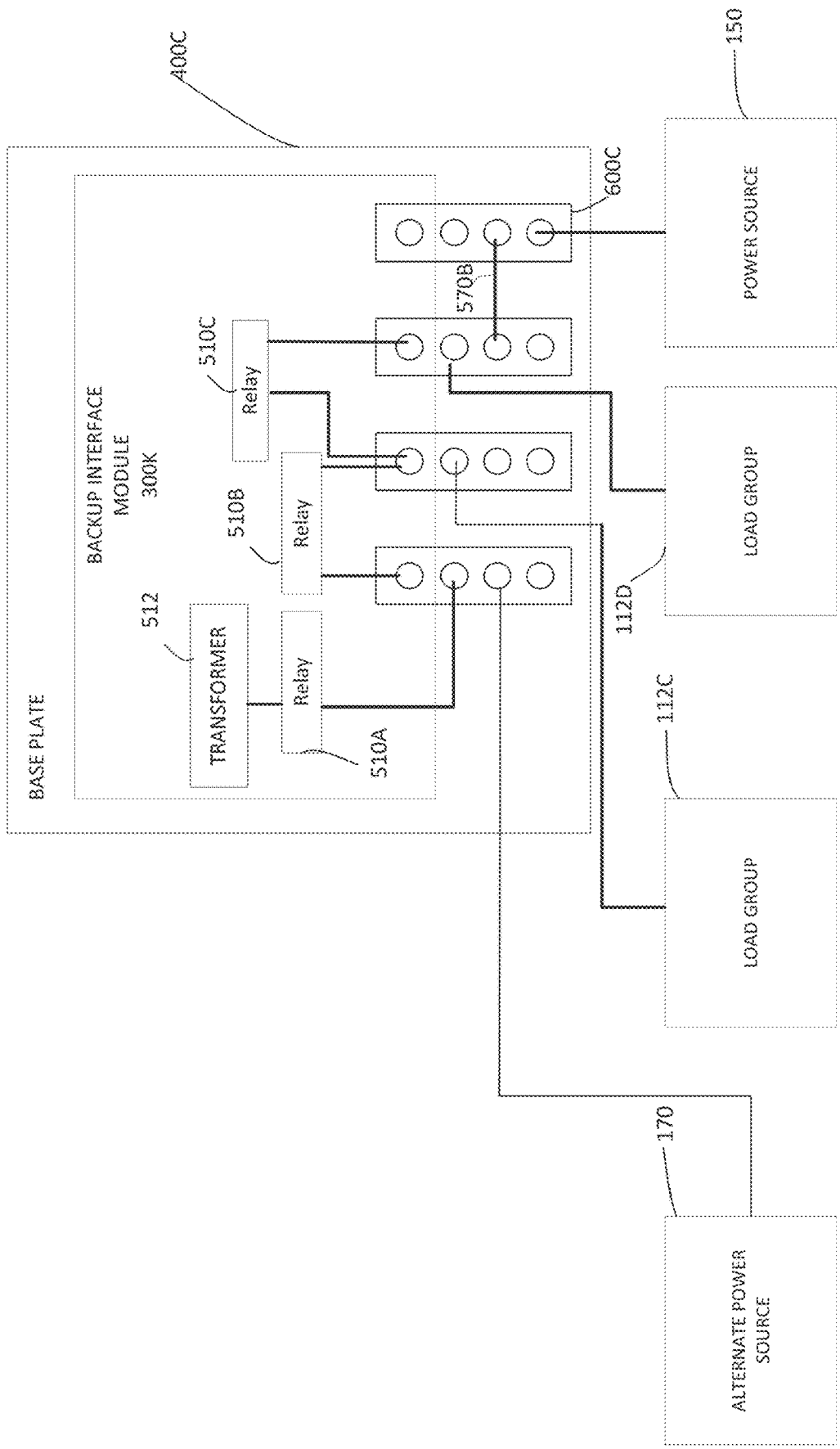
FIG. 21 shows an example wiring configuration of a backup system including a backup interface module

Reference is now made to FIG. 21, which shows an example wiring configuration of the backup system apparatus. Alternative power source 170, first and second load groups 112C and 112D, and power source (e.g., utility grid) 150 may be connected (such as may be shown in FIG. 18B). Relays 510A and 510B may be the same as or similar to relays 210A and 210B of FIG. 18B. In the example of FIG. 21, power source 150 may be directly connected to load group 112B via a jumper 570B such that in case of an outage of power source 150, load group 112D cannot be backed up while maintaining isolation from power source 150.

Backup interface module 300K may further include transformer 512. Transformer 512 may be connected to alternative power source 170 via relay 510A and a multi-terminal 600C, and may be configured to provide a split-phase voltage. For example, if power source 150 provides a split-phase grid voltage (e.g., two phases of about 110V or about 120V each) under normal operating conditions, relay 510C may be open (e.g., turned off) as long as power source 150 is connected to the system. If power source 150 is disconnected, transformer 512 may convert a voltage output of about 220V or about 240V provided by alternative power source 170 to two 110V or 120V split-phase outputs, such that the two 110/120V split phase outputs may be provided to load group 112C. In cases where load group 112D may also be backed up (e.g., in the system of FIG. 18B or 19B), the transformer 512 may also provide a split phase output to load group 112C. Transformer 512 may include three taps—two taps for receiving the 220/240V output of alternative power source 170, and a third, midpoint voltage tap for providing the split phase outputs.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Clauses

Clause 1: A base plate comprising: a frame; at least three multi-terminals, wherein each multi-terminal of the at least three multi-terminals comprises two or more terminal connectors; and at least one curved track.

Clause 2: The base plate of clause 1, wherein at least one terminal connector of the two or more terminal connectors is configured to electrically connect to a power device.

Clause 3: The base plate of any one of the preceding clauses, wherein at least one terminal connector of the two or more terminal connectors is configured to mechanically connect to a power device.

Clause 4: The base plate of any one of the preceding clauses, wherein at least one terminal connector of the two or more terminal connectors is configured to connect to a power source.

Clause 5: The base plate of any one of the preceding clauses, wherein at least one terminal connector of the two or more terminal connectors is configured to connect to a load group.

Clause 6: The base plate of any one of the preceding clauses, wherein at least one terminal connector of the two or more terminal connectors is configured to connect to at least one other terminal connector of a different one of the at least three multi-terminals.

Clause 7: The base plate of any one of the preceding clauses, wherein at least one multi-terminal of the at least three multi-terminals comprises three terminal connectors.

Clause 8: The base plate of any one of the preceding clauses, wherein the at least one curved track is C-shaped.

Clause 9: The base plate of any of the preceding clauses, wherein the frame is configured to mechanically connect to a mounting.

Clause 10: The base plate of clause 9, wherein the mounting comprises an electrical distribution panel.

Clause 11: The base plate of any one of clauses 1 to 7, wherein the at least one curved track is J-shaped.

Clause 12: The base plate of any one of the preceding clauses, wherein the at least one curved track is configured to accept a protuberance of a cover.

Clause 13: The base plate of clause 12, wherein the at least one curved track is configured to align an electromechanical connector of the cover with at least one multi-terminal of the multi-terminals of the base plate.

Clause 14: The base plate of clause 13, wherein the electromechanical connector is configured to be secured to the at least one multi-terminal of the multi-terminals of the base plate using at least one fastening element.

Clause 15: An apparatus for a backup interface comprising: at least one electrical circuit; a back cover; at least one protuberance; and at least three electromechanical connectors.

Clause 16: The apparatus of clause 15, wherein the back cover comprises at least one fin.

Clause 17: The apparatus of clause 16, wherein the at least one fin is configured to provide mechanical stiffness to the back cover.

Clause 18: The apparatus of clause 16, wherein the at least one fin is configured to provide thermal heat dissipation.

Clause 19: The apparatus of clause 16, wherein the at least one protuberance is configured to be accepted by a curved track of a base plate.

Clause 20: The apparatus of clause 19, wherein the curved track is configured to align an electromechanical connector of the back cover with at least one multi-terminal of the base plate.

Clause 21: The apparatus of clause 20, wherein the electromechanical connector is configured to be secured to the at least one multi-terminal of the base plate using at least one fastening element.

Clause 22: A backup interface enclosure comprising: a funnel region of a base plate; a curved central track connected to the funnel region; a curved end track connected to the curved central track; wherein a radius of the curved end track is less than a radius of the curved central track.

Clause 23: The backup interface enclosure of clause 22, wherein the radius of the curved end track is substantially less than the radius of the curved central track.

Clause 24: The backup interface enclosure of clause 22, wherein the radius of the curved end track is at least 10% less than the radius of the curved central track.

Clause 25: The backup interface enclosure of clause 22, wherein the radius of the curved end track is in a range of about 5 mm to about 45 mm.

Clause 26: The backup interface enclosure of clause 22, wherein the radius of the curved central track is in a range of about 20 mm to about 50 mm.

Clause 27: The backup interface enclosure of any one of clause 22 to clause 26, wherein the funnel region is defined by at least one curved edge.

Clause 28: The backup interface enclosure of any one of clauses 22 to 27, wherein the funnel region is defined by two edges.

Clause 29: The backup interface enclosure of clause 28, wherein the two edges are non-parallel edges.

Clause 30: The backup interface enclosure of any one of clauses 28 or clause 29, wherein a distance between the two edges increases as a distance from the curved central track increases.

Clause 31: The backup interface enclosure of any one of clause 22 to clause 29, further comprising at least one protuberance is configured to be accepted by the funnel region, curved central track, and curved end track of the base plate.

Clause 32: The backup interface enclosure of clause 31, wherein the funnel region, curved central track, and curved end track are configured to align an electromechanical connector of the backup interface enclosure with at least one multi-terminal of the base plate.

Clause 33: The backup interface enclosure of clause 32, wherein the electromechanical connector is configured to be secured to the at least one multi-terminal of the base plate using at least one fastening element.

Clause 34: A detachable hinge for a backup interface enclosure comprising: a curved track; and a protuberance.

Clause 35: The detachable hinge of clause 34, wherein the curved track comprises a funnel region.

Clause 36: The detachable hinge of clause 35, wherein the funnel region is connected to a curved central track region.

Clause 37: The detachable hinge of clause 36, wherein the curved central region is connected to a curved end track region.

Clause 38: The detachable hinge of clause 37, wherein a radius of the curved end track region is less than a radius of the curved central track region.

Clause 39: The detachable hinge of clause 38, wherein a radius of the protuberance is less than the radius of the curved central track region.

Clause 40: The detachable hinge of clause 39, wherein the radius of the protuberance is about equal to the radius of the curved end track region.

Clause 41: The detachable hinge of clause 40, wherein the protuberance is configured to rotate along an axis of the protuberance when the protuberance is in proximity to the curved end track region.

Clause 42: The detachable hinge of any one of clause 34 to clause 41, wherein the protuberance is configured to be accepted by the curved track, and the curved track is part of a base plate.

Clause 43: The detachable hinge of clause 42, wherein the curved track is configured to align an electromechanical connector of a cover with a multi-terminal of the base plate.

Clause 44: The detachable hinge of clause 43, wherein the electromechanical connector is configured to be secured to the multi-terminal of the base plate using a fastening element.

Clause 45: A multi-terminal for an interface enclosure comprising: a first terminal connector configured to electrically and mechanically connect to a power device; a second terminal connector configured to connect to a power source or a load group; a third terminal connector configured to connect to at least one other terminal connector of a different multi-terminal.

Clause 46: The multi-terminal of clause 45, wherein the multi-terminal is configured to be connected to a base plate.

Clause 47: The multi-terminal of clause 46, wherein base plate further comprises a curved track.

Clause 48: The multi-terminal of clause 47, wherein at least one protuberance is configured to be accepted by the curved track of the base plate.

Clause 49: The multi-terminal of clause 48, wherein the curved track is configured to align an electromechanical connector of a cover with the multi-terminal.

Clause 50: The multi-terminal of clause 49, wherein the electromechanical connector is configured to be secured to the multi-terminal using at least one fastening element.

Clause 51: An apparatus comprising: a base plate configured to mechanically connect to a backup interface module, wherein the base plate comprises a plurality of multi-terminals each comprising a plurality of terminal connections, and wherein each terminal connection of the plurality of terminal connections is configured to be connected to at least one of: a power source, a load group, or a different terminal connection of the plurality multi-terminals.

Clause 52: The apparatus of clause 51, wherein the base plate is configured to connect the power source to: the load group, and a second load group.

Clause 53: The apparatus of clause 52, wherein the power source is a utility grid.

Clause 54: The apparatus of clause 51, further comprising the backup interface module, wherein the backup interface module is mechanically and electrically configured to connect to the base plate.

Clause 55: The apparatus of clause 54, wherein the backup interface module comprises conductors directly connecting at least two of the plurality of multi-terminals to one another.

Clause 56: The apparatus of clause 51, wherein the backup interface module comprises circuitry electrically configured to connect at least two of the plurality of multi-terminals to the backup interface module.

Clause 57: The apparatus of clause 56, wherein the circuitry comprises at least one relay, and wherein the relay is connected between: a first multi-terminal of the plurality of multi-terminals, and a second multi-terminal of the plurality of multi-terminals.

Clause 58: The apparatus of clause 57, wherein the at least one relay is configured to selectively connect the load group to the power source.

Clause 59: The apparatus of clause 57, wherein the at least one relay is configured to selectively connect the load group to a second load group.

Clause 60: The apparatus of clause 57, wherein the circuitry comprises at least a first relay and a second relay, wherein the first relay is configured to selectively connect the load group to the power source, and wherein the second relay is configured to selectively connect the load group to the power source.

Clause 61: The apparatus of any one of clauses 56-60, wherein the circuitry comprises an automatic transfer switch configured to selectively connect the first multi-terminal to either the second multi-terminal or to a third multi-terminal.

Clause 62: The apparatus of clause 61, wherein the circuitry comprises an interlock configured to prevent the first multi-terminal being concurrently connected to the second multi-terminal and the third multi-terminal.

Clause 63: The apparatus of clause 62, wherein the interlock is an electrical interlock.

Clause 64: The apparatus of clause 63, wherein the electrical interlock is implemented by the automatic transfer switch.

Clause 65: The apparatus of any one of clauses 56-64, wherein the backup interface module further comprises a controller.

Clause 66: The apparatus of any one of clauses 56-65, wherein the controller is configured to control the circuitry.

Clause 67: The apparatus of any one of clauses 56-66, wherein the controller is configured to control the circuitry based on a sensor reading indicating a failure of the power source Clause 68: The apparatus of any one of clauses 56-67, wherein the controller is configured to control the circuitry based on receiving, via a communication device, a communication message indicating a failure of the power source.

Clause 69: The apparatus of any one of clauses 56-68, wherein the backup interface module further comprises a transformer configured to: receive a grid-level voltage at a first set of winding terminals; and output a split-phase grid voltage at a second set and third set of winding terminals.

Clause 70: The apparatus of clause 69, wherein the grid-level voltage is about 220V-240V, and wherein the split-phase grid voltages are about 110V-120V.

Clause 71: The apparatus of any one of clauses 69-70, wherein during a backup mode of operation, the controller is configured to control the circuitry to connect at least one of the second set and third set of winding terminals to at least one load group.

Clause 72: The apparatus of any one of clauses 51-71, wherein the load group is connected to the base plate via a first electrical distribution panel.

Clause 73: The apparatus of clause 72, wherein the base plate is further configured to be mounted alongside the first electrical distribution panel.

Clause 74: The apparatus of any one of clauses 51-73, wherein a second load group is connected to the base plate via a second electrical distribution panel.

Clause 75: The apparatus of clause 74, wherein the base plate is further configured to be mounted alongside the second electrical distribution panel.

Clause 76: The apparatus of any one of clauses 72-75, wherein the base plate, the first electrical distribution panel and the second electrical distribution panel are arranged inside a single electrical enclosure.

Clause 77: A method comprising: controlling, by a controller, circuitry of a backup interface module connected to: a first group of loads, a second group of loads, a primary power source, and a backup power source, to: connect, based on an availability of power from the primary power source, the primary power source to the first group of loads, the second group of loads, and the backup power source; and based on an outage of the primary power source: disconnect the primary power source from the first group of loads and the second groups of loads; and disconnect the backup power source from the first group of loads, the second group of loads, and the primary power source.

Clause 78: The method of clause 77, wherein disconnecting the primary power source comprises opening a relay.

Clause 79: The method of clause 77, wherein disconnecting the backup power source comprises opening a relay.

Clause 80: The method of any of clauses 77-79, further comprising determining the outage based on sensor measurements indicating an outage of the primary power source.

Clause 81: A method comprising: connecting a first load group to a first multi-terminal of a base plate; connecting a second load group to a second multi-terminal of the base plate; connecting a primary power source to a third multi-terminal of the base plate; connecting an alternative power source to a fourth multi-terminal of the base plate; and selectively connecting a plurality of multi-terminals to one another according to one of a plurality of configurations, wherein a first configuration of the plurality of configurations comprises hard-wiring the first, second, third and fourth multi-terminals to one another, and wherein a second configuration of the plurality of configurations comprises connecting a backup interface module to the base plate, wherein the backup interface module comprises active circuitry for selectively connecting, by a controller, the first, second, third, and fourth multi-terminals based on an operating condition of the primary power source.

The invention claimed is:

1. An apparatus comprising:
an output terminal,
a backup interface module comprising a relay and an electromechanical connector, and
a base plate mechanically connected to the backup interface module,
wherein:
the base plate comprises a first multi-terminal and a second multi-terminal,
the first multi-terminal and the second multi-terminal are directly attached to the electromechanical connector of the backup interface module,
the first multi-terminal comprises a first terminal, a second terminal, and a third terminal,
the first terminal is connected to the output terminal,
the second terminal is connected to the second multi-terminal, and
the third terminal is connected to the relay.

2. The apparatus of claim 1, wherein the second multi-terminal is connected to a power source.

3. The apparatus of claim 2, wherein the power source is a utility grid.

4. The apparatus of claim 1, wherein the base plate comprises a third multi-terminal, and the third multi-terminal is connected to the relay.

5. The apparatus of claim 4, wherein the output terminal is connected to a first load group, and the third multi-terminal is connected to a second load group.

6. The apparatus of claim 5, wherein the third multi-terminal is connected to a second relay.

7. The apparatus of claim 6, wherein the base plate comprises a fourth multi-terminal and the second relay is connected to the fourth multi-terminal.

8. The apparatus of claim 7, wherein the second multi-terminal is connected to a first power source, and the fourth multi-terminal is connected to a second power source.

9. The apparatus of claim 7, wherein the fourth multi-terminal is connected to a third relay.

10. The apparatus of claim 1, wherein the base plate comprises a third multi-terminal and the second multi-terminal is connected to the third multi-terminal.

11. The apparatus of claim 10, wherein the third multi-terminal is connected to a power source.

12. The apparatus of claim 10, wherein the base plate comprises a fourth multi-terminal and the relay is connected to the fourth multi-terminal.

13. The apparatus of claim 12, wherein the output terminal is connected to a first load group, and the fourth multi-terminal is connected to a second load group.

14. The apparatus of claim 13, wherein the third multi-terminal is connected to a first power source, and the second load group is connected to a second power source.

15. The apparatus of claim 1, wherein the output terminal is connected to a first load group, and the second multi-terminal is connected to a second load group.

16. The apparatus of claim 15, wherein the second load group is connected to a power source.

17. The apparatus of claim 16, wherein the power source is a photovoltaic (PV) power source.

18. The apparatus of claim 15, wherein the base plate comprises a third multi-terminal and a fourth multi-terminal, the third multi-terminal is connected to the relay, and the third multi-terminal is connected to the fourth multi-terminal.

19. The apparatus of claim 18, wherein the second load group is connected to a first power source and the fourth multi-terminal is connected to a second power source.

20. The apparatus of claim 1, wherein the output terminal is connected to a load group.

\* \* \* \* \*